United States Patent
Kruschwitz et al.

(10) Patent No.: US 6,950,454 B2
(45) Date of Patent: Sep. 27, 2005

(54) ELECTRONIC IMAGING SYSTEM USING ORGANIC LASER ARRAY ILLUMINATING AN AREA LIGHT VALVE

(75) Inventors: Brian E. Kruschwitz, Rochester, NY (US); Keith B. Kahen, Rochester, NY (US); Andrew F. Kurtz, Rochester, NY (US); John P. Spoonhower, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/395,730

(22) Filed: Mar. 24, 2003

(65) Prior Publication Data

US 2004/0190573 A1 Sep. 30, 2004

(51) Int. Cl.[7] .............................. H01S 3/08; H01S 3/14
(52) U.S. Cl. .......................................... 372/92; 372/39
(58) Field of Search ........................ 372/39, 92, 96–99; 359/619–623; 257/40

(56) References Cited

U.S. PATENT DOCUMENTS

| | | | |
|---|---|---|---|
| 5,325,386 A | * | 6/1994 | Jewell et al. ................. 372/50 |
| 5,384,797 A | | 1/1995 | Welch et al. |
| 5,389,196 A | * | 2/1995 | Bloomstein et al. .......... 216/66 |
| 5,517,359 A | * | 5/1996 | Gelbart ....................... 359/623 |
| 5,704,700 A | * | 1/1998 | Kappel et al. ................ 353/31 |
| 5,881,083 A | | 3/1999 | Diaz-Garcia et al. |
| 5,881,089 A | | 3/1999 | Berggren et al. |
| 5,923,475 A | | 7/1999 | Kurtz et al. |
| 5,990,983 A | * | 11/1999 | Hargis et al. ................ 348/758 |
| 6,160,828 A | * | 12/2000 | Kozlov et al. ................ 372/39 |
| 6,194,119 B1 | | 2/2001 | Wolk et al. |
| 6,318,863 B1 | | 11/2001 | Tiao et al. |
| 6,621,615 B2 | * | 9/2003 | Kruschwitz et al. ........ 359/264 |
| 6,674,776 B2 | * | 1/2004 | Kahen et al. ................. 372/39 |
| 6,687,274 B2 | * | 2/2004 | Kahen .......................... 372/39 |
| 6,836,495 B2 | * | 12/2004 | Kahen .......................... 372/39 |
| 6,845,114 B2 | * | 1/2005 | Patton et al. ................. 372/39 |
| 6,853,660 B2 | * | 2/2005 | Spoonhower et al. ......... 372/39 |
| 2002/0196414 A1 | * | 12/2002 | Manni et al. ................. 353/31 |

OTHER PUBLICATIONS

U.S. Appl. No. 09/832,759, filed Apr. 11, 2001, Kahen et al.
U.S. Appl. No. 10/066,829, filed Feb. 4, 2002, Kahen.
U.S. Appl. No. 10/137,761, filed May 2, 2002, Spoonhower et al.
U.S. Appl. No. 10/272,548, filed Oct. 16, 2002, Kaminsky et al.
Susumu Kinoshita et al., "Circular Buried Heterostructure (CBH) GaAlAs/GaAs Surface Emitting Lasers," IEEE Journal of Quantum Electronics, vol. QE–23, No. 6, Jun. 1987, pp. 882–888.
G. Kranzelbinder et al., "Organic Solid–State Lasers," Rep. Prog. Phys. 63 (2000) pp. 729–762.
N. Tessler et al., "Pulsed Excitation of Low–Mobility Light–Emitting Diodes: Implication for Organic Lasers," Applied Physics Letters, vol. 74, No. 19, May 10, 1999, pp. 2764–2766.

(Continued)

*Primary Examiner*—Minsun Oh Harvey
*Assistant Examiner*—Phillip Nguyen
(74) *Attorney, Agent, or Firm*—Stephen H. Shaw

(57) ABSTRACT

An electronic imaging system for providing a viewable color image from an image data stream, including: a plurality of different colored laser light sources arranged in an at least one array with each such colored laser light source including a vertical cavity design; at least one area light valve for receiving the laser light and producing the viewable color image from the image data stream; and a projection lens for projecting the viewable color image onto a target plane.

64 Claims, 15 Drawing Sheets

OTHER PUBLICATIONS

V. G. Kozlov et al., "Study of Lasing Action Based on Forster Energy Transfer in Optically Pumped Organic Semiconductor Thin Films," Journal of Applied Physics, vol. 84, No. 8, Oct. 15, 1998, pp. 4096–4106.

Scott W. Corzine et al., "Design of Fabry–Perot Surface–Emitting Lasers With a Periodic Gain Structure," IEEE Journal of Quantum Electronics, vol. 25, No. 6, Jun. 1989, pp. 1513–1524.

Kent D. Choquette, et al., "Vertical–Cavity Surface Emitting Lasers: Moving From Research to Manufacturing," Proceedings of the IEEE, vol. 85, No. 11, Nov. 1997, pp. 1730–1739.

T. Ishigure et al., "2.5 Gbit/s 100m Data Transmission Using Graded–Index Polymer Optical Fibre and High–speed laser Diode at 650nm Wavelength," Electronics Letters, vol. 31, No. 6, Mar. 16, 1995, pp. 467–469.

Carl W. Wilmsen et al., "Vertical–Cavity Surface–Emitting Lasers," Cambridge University Press, 1999.

Nir Tessler et al., "High Peak Brightness Polymer Light–Emitting Diodes," Advanced Materials, vol. 10, No. 1, 1998, pp. 64–68.

J. H. Schon et al., "An Organic Solid State Injection Laser," SCIENCE, vol. 289, Jul. 28, 2000, pp. 599–601.

M. D. McGehee et al., "Semiconducting Polymer Distributed Feedback Lasers," Applied Physics Letters, vol. 72, No. 13, Mar. 30, 1998, pp. 1536–1538.

M. Berggren, "Light Amplification in Organic Thin Films Using Cascade Energy Transfer," Letters to Nature, vol. 389, Oct. 2, 1997, pp. 466–469.

H. Kogelnik, "Theory of Dielectric Waveguides," Chapter 2 of "Integrated Optics," Ed. by T. Tamir, Springer–Verlag, 1979.

A. G. Fox and Tingye Li, "Resonant Modes in a Maser Interferometer," The Bell System Technical Journal, Mar. 1961, pp. 453–489.

Toshiaki Iwai et al., "Speckle Reduction in Coherent Information Processing," Proceedings of the IEEE, vol. 84, No. 5, May 1996, pp. 765–781.

S. Riechel et al., "Very Compact Tunable Solid–state Laser Utilizing a Thin–Film Organic Semiconductor," Optics Letters, vol. 26, No. 9, May 1, 2001, pp. 593–595.

G. Parry, "Speckle Patterns in Partially Coherent Light," Chapter 3 in Laser Speckle and Related Phenomena, Edited by J. C. Dainty, Springer, 1975, pp. 77–121.

* cited by examiner

ELECTRONIC IMAGING SYSTEM USING ORGANIC LASER ARRAY ILLUMINATING AN AREA LIGHT VALVE

CROSS-REFERENCE TO RELATED APPLICATIONS

This application is related to commonly assigned U.S. patent application Ser. No. 09/832,759 filed Apr. 11, 2001 entitled "Incoherent Light-Emitting Device Apparatus for Driving Vertical Laser Cavity" by Keith B. Kahen et al. and U.S. patent application Ser. No. 10/395,484, filed Apr. 11, 2003, by Thomas M. Stephany, et al., and entitled, "Organic Fiber Laser System." Applicants claim domestic priority of U.S. patent application Ser. No. 09/832,759 under 35 U.S.C. sections 120 and/or 121. Additionally, reference is made to commonly assigned U.S. patent application Ser. No. 10/066,829 filed Feb. 4, 2002 entitled "Organic Vertical Cavity Phase-Locked Laser Array Device" by Keith B. Kahen; commonly assigned U.S. patent application Ser. No. 10/137,761 filed May 2, 2002 entitled "Scanned Display Systems Using Color Laser Light Sources" by Spoonhower et al.; and commonly assigned U.S. patent application Ser. No. 10/272,548 filed Oct. 16, 2002 entitled "Display Systems Using Organic Laser Light Sources" by Kaminsky et al., the disclosures of which are incorporated herein by reference.

FIELD OF THE INVENTION

The invention relates generally to the field of display or printing systems, and in particular to a display or printing system using an area light valve illuminated with laser light. More specifically, the invention relates to the use of an array of organic laser elements illuminating an area light valve in a display or a printing system.

BACKGROUND OF THE INVENTION

Electronic imaging systems that include light valves for spatially modulating a light beam with information are well known in the prior art. Common applications of such systems include projection displays and printing systems. Typically, these systems have taken the basic form of a white light source, most notably an incandescent or arc lamp, illuminating one or more light valves or spatial light modulators with appropriate color filtering to form the desired image, the image being projected onto a viewing screen or photosensitive medium.

Lasers have been known to be attractive alternative light sources to lamps for light-valve-based projection displays and printing systems. One potential advantage of lasers is a wider color gamut featuring very saturated colors. Laser illumination offers the potential for simple, low-cost efficient optical systems, providing improved efficiency and higher contrast when paired with some conventional light valves. One disadvantage of lasers for projection display is the lack of a cost-effective laser source with sufficient power at appropriate visible wavelengths.

The lack of availability of low-cost visible lasers suitable for electronic imaging systems in displays and photographic printers has largely hampered the development of light-valve-based laser electronic imaging systems for these markets. In a typical television application, for example, red, green, and blue lasers are required at a power level of approximately 1 W each. Currently available blue and green lasers at that power level, such as intracavity-doubled diode-pumped solid-state lasers, are extremely expensive due to the need for diode laser pumping of a solid-state laser crystal, assembly of a resonator, and the need for nonlinear frequency conversion to produce visible light. There are further problems with stability and lifetime that must be addressed. Furthermore, single lasers for each color are in many ways undesirable for a display or printing system. Because these lasers are both spectrally and spatially coherent, coherence artifacts within the optical systems, as would arise from etalon effects in air gaps or thin glass elements in the system, should, preferably, be avoided. In display systems, speckle arising due to the rough display screen has to be defeated, which is made difficult by the spectral and spatial coherence of the laser sources. Finally, as has already been discussed, the area light valves of interest do not require a very spatially coherent source. Hence, it would be desirable to use a laser source with low spectral and spatial coherence.

Light valves that consist of a two-dimensional array of individually operable pixels, arrayed in a rectangle, provide another component that enable laser display and printing systems. Examples of area light valves include reflective liquid crystal modulators, such as the liquid-crystal-on-silicon (LCOS) modulators that are available from JVC, Three-Five, Aurora, and Philip; and micromirror arrays, such as the Digital Light Processing (DLP) chips available from Texas Instruments. Advantages of two-dimensional modulators over one-dimensional array modulators and raster-scanned systems are the absence of required scanning; absence of streak artifacts due to nonuniformities in the modulator array; and immunity to laser noise at frequencies much greater than the frame refresh rate ($\geq 120$ Hz) in display systems. A further advantage of two-dimensional spatial light modulators is the tolerance for low spatial coherence of the illuminating beam. In contrast, one-dimensional or linear light valves, such as the Grating Light Valve (GLV) produced by Silicon Light Machines and conformal grating modulators, require a spatially coherent illumination in the short dimension of the light valve.

One means of providing laser light with low spatial and spectral coherence is to utilize multiple laser sources. International Application Published Under the Patent Cooperation Treaty (PCT), International Publication No. WO 95/20811, published on Aug. 3, 1995 by Waarts et al., titled "Laser Illuminated Display System" discloses the use of multiple diode lasers multiplexed and fiber-coupled to illuminate a spatial light modulator. U.S. Pat. No. 6,318,863 issued Nov. 20, 2001 to Tiao et al., and titled "Illumination Device And Image Projection Apparatus Including The Same," discloses an illumination device using multiple light sources (laser diodes are used in one embodiment) coupled to an array of tapered light pipes to illuminate an area light valve. Other instances of the prior art have used laser arrays. U.S. Pat. No. 5,704,700 issued Jan. 6, 1998 to Kappel et al., and titled "Laser Illuminated Image Projection System And Method Of Using Same," discloses an image projection system in which a microlaser array is coupled to a beam shaper to illuminate a light valve. Furthermore, U.S. Pat. No. 5,923,475 issued Jul. 13, 1999 to Kurtz et al., and titled "Laser Printer Using A Fly's Eye Integrator," discloses a printing system using a diode laser array and a light valve.

When using an area light valve in a display or printing system requiring the use of RGB laser arrays, one often desires to use fully integrated two-dimensional laser arrays. One of the few laser technologies that are easily integrable in two dimensions is a vertical-cavity surface-emitting laser (VCSEL).

VCSELs, based on inorganic semiconductors, (e.g., AlGaAs), have been developed since the mid-80's ("Circular Buried Heterostructure (CBH) GaAlAs/GaAs surface Emitting Lasers" by Susumu Kinoshita et al., IEEE Journal of Quantum Electronics, Vol. QE-23, No. 6, June 1987). They have reached the point where AlGaAs-based VCSELs, emitting at 850 nm, are manufactured by a number of companies and have lifetimes beyond 100 years ("Vertical-Cavity Surface Emitting Lasers: Moving from Research to Manufacturing" by Kent D. Choquette et al., Proceedings of the IEEE, Vol. 85, No. 11, November 1997). With the success of these near-infrared lasers, attention in recent years has turned to other inorganic material systems to produce VCSELs emitting in the visible wavelength range ("Vertical-Cavity Surface-Emitting Lasers" by Carl W. Wilmsen et al., Cambridge University Press, Cambridge, 2001). There are many potential applications for visible lasers, such as, display, optical storage reading/writing, laser printing, and short-haul telecommunications employing plastic optical fibers ("2.5 Gbit/s 100 m data transmission using graded-index polymer optical fibre and high-speed laser diode at 650 nm wavelength" by T. Ishigure et al., Electronics Letters, Mar. 16, 1995, Vol. 31, No. 6). In spite of the worldwide efforts of many industrial and academic laboratories, much work remains to be done to create viable laser diodes (either edge emitters or VCSELs) that produce light output spanning the visible spectrum.

In an effort to produce visible wavelength VCSELs it would be advantageous to abandon inorganic-based systems and focus on organic-based laser systems, since organic-based gain materials can enjoy a number of advantages over inorganic-based gain materials in the visible spectrum. For example, typical organic-based gain materials have the properties of low unpumped scattering/absorption losses and high quantum efficiencies. In comparison to inorganic laser systems, organic lasers are relatively inexpensive to manufacture, emit over the entire visible range; can be scaled to arbitrary size; and most importantly, are able to emit multiple wavelengths (such as red, green, and blue) from a single chip. Over the past number of years, there has been increasing interest in making organic-based solid-state lasers. The laser gain material has been either polymeric or small molecule and a number of different resonant cavity structures were employed, such as VCSEL (see U.S. Pat. No. 6,160,828 issued Dec. 12, 2000 to Kozlov et al., and titled "Organic Vertical-Cavity Surface-Emitting Laser"), waveguide, ring microlasers, and distributed feedback (see also, for instance, "Organic solid-state lasers" by G. Kranzelbinder et al., Rep. Prog. Phys. 63, 2000, and U.S. Pat. No. 5,881,083 issued Mar. 9, 1999 to Diaz-Garcia et al., and titled "Conjugated Polymers As Materials For Solid State Laser"). A problem with all of these structures is that in order to achieve lasing it is necessary to excite the cavities by optical pumping using another laser source. It is much preferred to electrically pump the laser cavities, since this generally results in more compact and easier to modulate structures.

A main barrier to achieving electrically-pumped organic lasers is the low carrier mobility of organic material, which is typically on the order of $10^{-5}$ cm$^2$/(V–s). This low carrier mobility results in a number of problems. Devices with low carrier mobilities are typically restricted to using thin layers in order to avoid large voltage drops and ohmic heating. These thin layers result in the lasing mode penetrating into the lossy cathode and anode, which causes a large increase in the lasing threshold ("Study of lasing action based on Förster energy transfer in optically pumped organic semiconductor thin films" by V. G. Kozlov et al., Journal of Applied Physics, Vol. 84, No. 8, Oct. 15, 1998). Since electron-hole recombination in organic materials is governed by Langevin recombination (whose rate scales proportional to the carrier mobility), low carrier mobilities result in orders of magnitude having more charge carriers than singlet excitons. Consequently, charge-induced (polaron) absorption can become a significant loss mechanism ("Pulsed excitation of low-mobility light-emitting diodes: Implication for organic lasers" by N. Tessler et al., Applied Physics Letters, Vol. 74, No. 19, May 10, 1999). Assuming laser devices have a 5% internal quantum efficiency, using the lowest reported lasing threshold to date of ~100 W/cm$^2$ ("Light amplification in organic thin films using cascade energy transfer" by M. Berggren et al., Letters to Nature, Vol. 389, Oct. 2, 1997), and ignoring the above mentioned loss mechanisms, puts a lower limit on the electrically-pumped lasing threshold of 1000 A/cm$^2$. Including these loss mechanisms places the lasing threshold well above 1000 A/cm$^2$, which to date is the highest reported current density, that can be supported by organic devices ("High Peak Brightness Polymer Light-Emitting Diodes" by Nir Tessler, et al., Advanced Materials, 1998, 10, No. 1).

One way to avoid these difficulties is to use crystalline organic material instead of amorphous organic material as the lasing media. This approach was recently taken ("An Organic Solid State Injection Laser" by J. H. Schon, Science, Vol. 289, Jul. 28, 2000) where a Fabry-Perot resonator was constructed using single crystal tetracene as the gain material. By using crystalline tetracene, larger current densities can be obtained; thicker layers can be employed (since the carrier mobilities are on the order of 2 cm$^2$/(V–s)); and polaron absorption is much lower. This organic structure results in room temperature laser threshold current densities of approximately 1500 A/cm$^2$.

One of the advantages of organic-based lasers is that since the gain material is typically amorphous, devices can be formed inexpensively when compared to lasers with gain materials that require a high degree of crystallinity (either inorganic or organic materials). Additionally, lasers based upon organic amorphous gain materials can be fabricated over large areas without regard to producing large regions of single crystalline material; as a result they can be scaled to arbitrary size resulting in greater output powers. Because of their amorphous nature, organic-based lasers can be grown on a wide variety of substrates; thus, materials such as glass, flexible plastics, and silicon are possible supports for these devices. Thus, there can be significant cost advantages as well as a greater choice in usable support materials for amorphous organic-based lasers.

An alternative to electrical pumping for organic lasers is optical pumping by incoherent light sources, such as light emitting diodes (LEDs), either inorganic ("Semiconducting polymer distributed feedback laser" by M. D. McGehee et al., Applied Physics Letters, Vol. 72, No. 13, Mar. 30, 1998) or organic (U.S. Pat. No. 5,881,089 issued Mar. 9, 1999 to Berggren et al, and titled "Article Comprising An Organic Laser"). This possibility is the result of unpumped organic laser systems having greatly reduced combined scattering and absorption losses (~0.5 cm$^{-1}$) at the lasing wavelength, especially when one employs a host-dopant combination as the active media. Even taking advantage of these small losses, the smallest reported optically-pumped threshold for organic lasers to date is 100 W/cm$^2$ based on a waveguide laser design ("Light amplification in organic thin films using cascade energy transfer" by M. Berggren et al., Nature, Vol. 389, Oct. 2, 1997). Since off-the-shelf inorganic LEDs can only provide up to ~20 W/cm$^2$ of power density, it is necessary to take a different route to incorporate optical pumping by incoherent sources. What is needed is a method of minimizing gain volume in a laser area structure while enabling optically pumped power density thresholds below 5 W/cm$^2$.

SUMMARY OF THE INVENTION

The present invention is directed to overcoming one or more of the problems set forth above by providing an electronic imaging system for providing a viewable color image from an image data stream, that includes a viewing screen for receiving colored laser light and having a diffusing element so that the electronic imaging system, in response to colored laser light, produces a viewable color image. Also included in the electronic imaging system are a plurality of different colored laser light sources arranged in an at least one array with each such laser light source including a vertical cavity design having: I) a first dielectric stack for receiving and transmitting pump beam light and being reflective to laser light over a predetermined range of wavelengths; ii) an organic active region for receiving transmitted pump beam light from the first dielectric stack and emitting the laser light; and iii) a second dielectric stack for reflecting transmitted pump beam light and laser light from the organic active region back into the organic active region, wherein a combination of the first and the second dielectric stacks and the organic active region produces the laser light. Additionally, included in the electronic imaging system is at least one area light valve for receiving the laser light and producing the viewable color image from the image data stream.

ADVANTAGEOUS EFFECT OF THE INVENTION

The present invention has the following advantages: improving image uniformity, reducing flare while letterboxing, and suppressing the appearance of laser speckle. Additionally, the present invention provides a printing system using an area light valve and at least one optically pumped organic VCSEL array. Therefore, the present invention can be driven by optically pumping with a variety of readily available, incoherent light sources, such as LEDs. Furthermore, because the pump LEDs can be arrayed over an area, the organic laser in the present invention can be built into two-dimensional arrays.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

Figure 1:
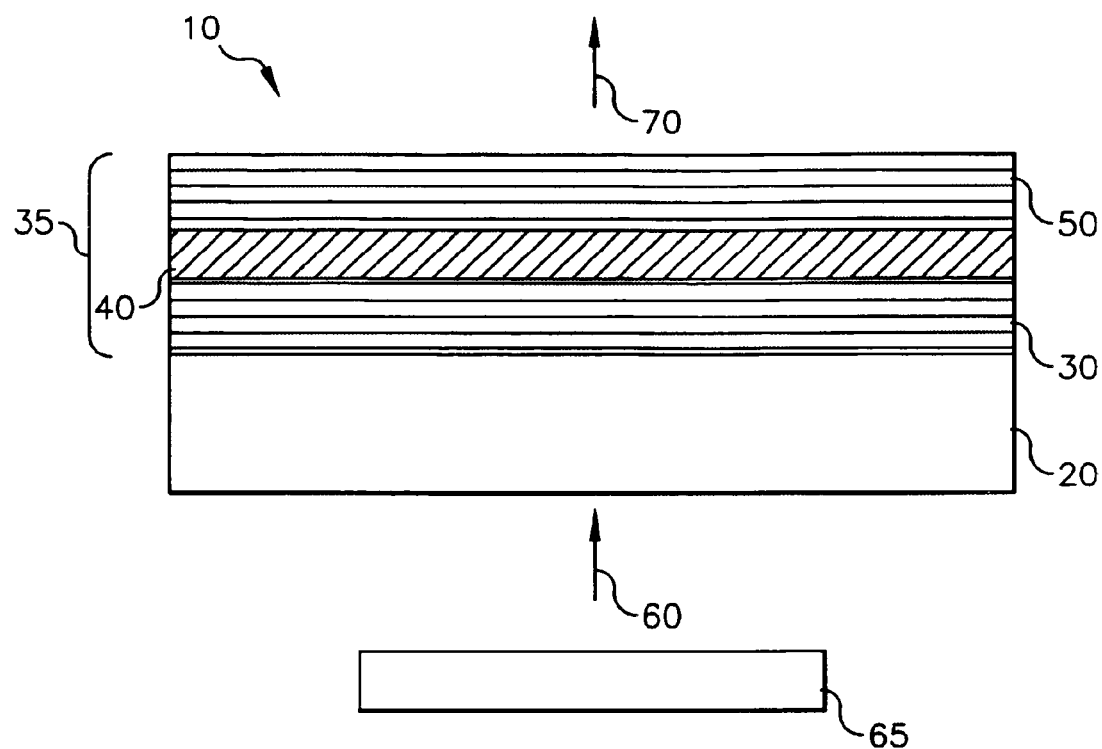
FIG. 1 is a schematic cross-sectional view of a vertical cavity organic laser device.

A schematic of a vertical cavity organic laser device 10 is shown in FIG. 1. The substrate 20 can either be light transmissive or opaque, depending on the intended direction of optical pumping and laser emission. Light transmissive substrates 20 may be transparent glass, plastic, or other transparent materials such as sapphire. Alternatively, opaque substrates including, but not limited to, semiconductor material (e.g. silicon) or ceramic material may be used in the case where both optical pumping and emission occur through the same surface. On the substrate is deposited an organic laser film structure 35, which comprises a first dielectric stack 30 followed by an organic active region 40 and a second dielectric stack 50. A pump beam 60, emitted from a source of photons 65, optically pumps the vertical cavity organic laser device 10 through the first dielectric stack 30, which is substantially transmissive for the pump beam 60. The second dielectric stack 50 should be substantially reflective for the pump beam 60 in order to force the pump beam 60 to pass through the organic active region 40 twice. The source of the pump beam 60 may be incoherent, such as emission from a light-emitting diode (LED). Alternatively, the pump beam 60 may originate from a coherent laser source. FIG. 1 shows the pump beam 60 being delivered through the substrate 20, and the laser light 70 exiting from the second dielectric stack 50. Alternatively, the vertical cavity organic laser device 10 could be operated with the pump beam 60 delivered from the air side and the laser light 70 exiting into the substrate 20 by essentially inverting the organic laser film structure 35. In the case of an opaque substrate, such as silicon, both optical pumping and laser emission occur through the air side, which can be achieved with the organic laser film structure 35 inverted from that shown in FIG. 1.

The preferred material for the organic active region 40 is a small-molecular weight organic host-dopant combination typically deposited by high-vacuum thermal evaporation. These host-dopant combinations are advantageous since they result in very low unpumped scattering/absorption losses for the gain media. It is preferred that the organic molecules be of small-molecular weight, since vacuum-deposited materials can be deposited more uniformly than spin-coated polymeric materials. It is also preferred that the host materials used in the present invention are selected such that they have sufficient absorption of the pump beam 60 and are able to transfer a large percentage of their excitation energy to a dopant material via Förster energy transfer. Those skilled in the art are familiar with the concept of Förster energy transfer, which involves a radiationless transfer of energy between the host and dopant molecules. An example of a useful host-dopant combination for red-emitting lasers is aluminum tris(8-hydroxyquinoline) (Alq) as the host and [4-(dicyanomethylene)-2-t-butyl-6-(1,1,7,7-tetramethyljulolidyl-9-enyl)-4H-pyran] (DCJTB) as the dopant (at a volume fraction of 1%). Other host-dopant combinations can be used for other wavelength emissions. For example, in the green a useful combination is Alq as the host and [10-(2-benzothiazolyl)-2,3,6,7-tetrahydro-1,1,7,7-tetramethyl-1H,5H,11H-[1]Benzopyrano[6,7,8-ij]quinolizin-11-one] (C545T) as the dopant (at a volume fraction of 0.5%). Other organic gain region materials can be polymeric substances, e.g., polyphenylenevinylene derivatives, dialkoxy-polyphenylenevinylenes, poly-para-phenylene derivatives, and polyfluorene derivatives, as taught in commonly assigned U.S. Pat. No. 6,194,119 issued Feb. 27, 2001 to Wolk et al., and referenced herein.

The first and second dielectric stacks 30 and 50, respectively, are preferably deposited by conventional electron-beam deposition and can comprise alternating high index and low index dielectric materials, such as, $TiO_2$ and $SiO_2$, respectively. Other materials, such as $Ta_2O_5$ for the high index layers, could be used. In the embodiment shown in FIG. 1, the first dielectric stack 30 is deposited at a temperature of approximately 240° C. During the second dielectric stack 50 deposition process, the temperature is maintained at around 70° C. to avoid melting the organic active materials. In an alternative embodiment of the present invention, the second dielectric stack is replaced by the deposition of a reflective metal mirror layer. Typical metals are silver or aluminum, which have reflectivities in excess of 90%. In this alternative embodiment, both the pump beam 60 and the laser light 70 would proceed through the substrate 20. Both the first dielectric stack 30 and the second dielectric stack 50 are reflective to laser light over a predetermined range of wavelengths, in accordance with the desired emission wavelength of the vertical cavity organic laser device 10.

The use of a vertical microcavity with very high finesse allows a lasing transition at a very low threshold (below 0.1 $W/cm^2$ power density). This low threshold enables incoherent optical sources to be used for the pumping instead of the focused output of laser diodes, which is conventionally used in other laser systems. An example of a pump source is a UV LED, or an array of UV LEDs, e.g. from Cree (specifically, the XBRIGHT® 900 UltraViolet Power Chip® LEDs). These sources emit light centered near 405 nm wavelength and are known to produce power densities on the order of 20 $W/cm^2$ in chip form. Thus, even taking into account limitations in utilization efficiency due to device packaging and the extended angular emission profile of the LEDs, the LED brightness is sufficient to pump the laser cavity at a level many times above the lasing threshold.

Figure 2:
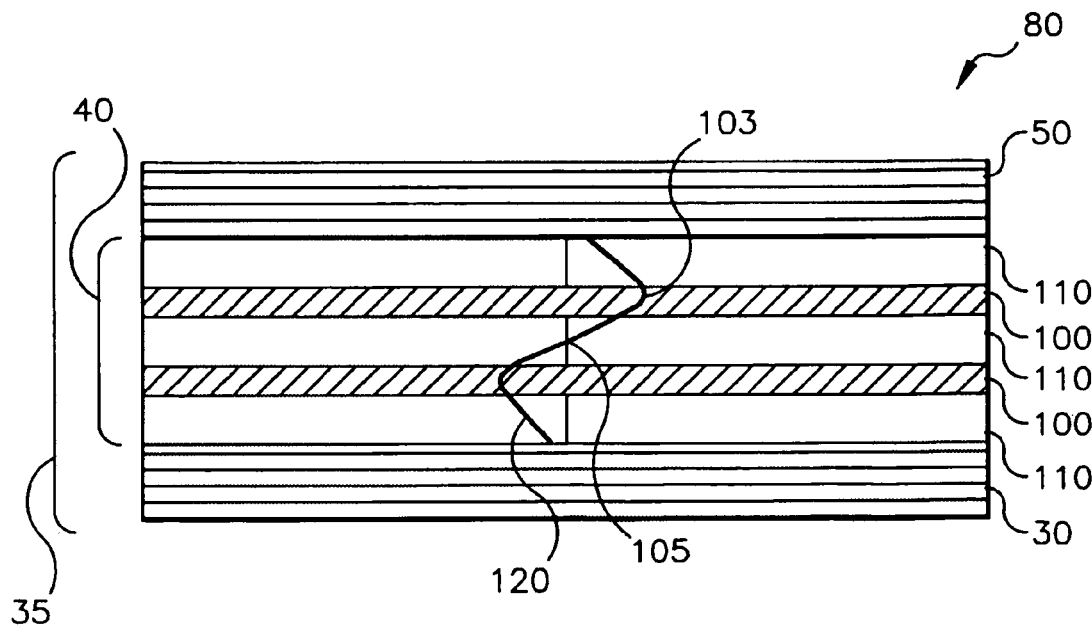
FIG. 2 is a schematic cross-sectional view of a vertical cavity organic laser device using a resonant periodic gain structure.

The efficiency of the laser is improved further using an active region design as depicted in FIG. 2 for the vertical cavity organic laser device 80. The organic laser film structure 35 comprises an organic active region 40 that includes one or more periodic gain regions 100 and organic spacer layers 110 disposed on either side of the periodic gain regions 100 and arranged so that the periodic gain regions 100 are aligned with antinodes 103 of the device's standing wave electromagnetic field. This is illustrated in FIG. 2 where the laser's standing electromagnetic field pattern 120 in the organic active region 40 is schematically drawn. Since stimulated emission is highest at the antinodes 103 and negligible at the nodes 105 of the electromagnetic field, it is inherently advantageous to form the organic active region 40 as shown in FIG. 2. The organic spacer layers 110 do not undergo stimulated or spontaneous emission and largely do not absorb either the laser light 70 or the pump beam 60 wavelengths. An example of a spacer layer 110 is the organic material 1,1-Bis-(4-bis(4-methyl-phenyl)-amino-phenyl)-cyclohexane (TAPC). TAPC works well as the spacer material since it largely does not absorb either the laser output or the pump beam energy and, in addition, its refractive index is slightly lower than that of most organic host materials. This refractive index difference is useful since it helps in maximizing the overlap between the electromagnetic field antinodes 103 and the periodic gain region(s) 100. As will be discussed below with reference to the present invention, employing periodic gain region(s) instead of a bulk gain region results in higher power conversion efficiencies and a significant reduction of the unwanted spontaneous emission. The placement of the periodic gain region(s) is determined by using the standard matrix method of optics (Scott W. Corzine et al., "Design of Fabry-Perot Surface-Emitting Lasers with a Periodic Gain Structure," IEEE Journal of Quantum Electronics, Vol. 25, No. 6, June 1989). To get good results, the thicknesses of the periodic gain region(s) 100 need to be at or below 50 nm in order to avoid unwanted spontaneous emission.

Figure 3:
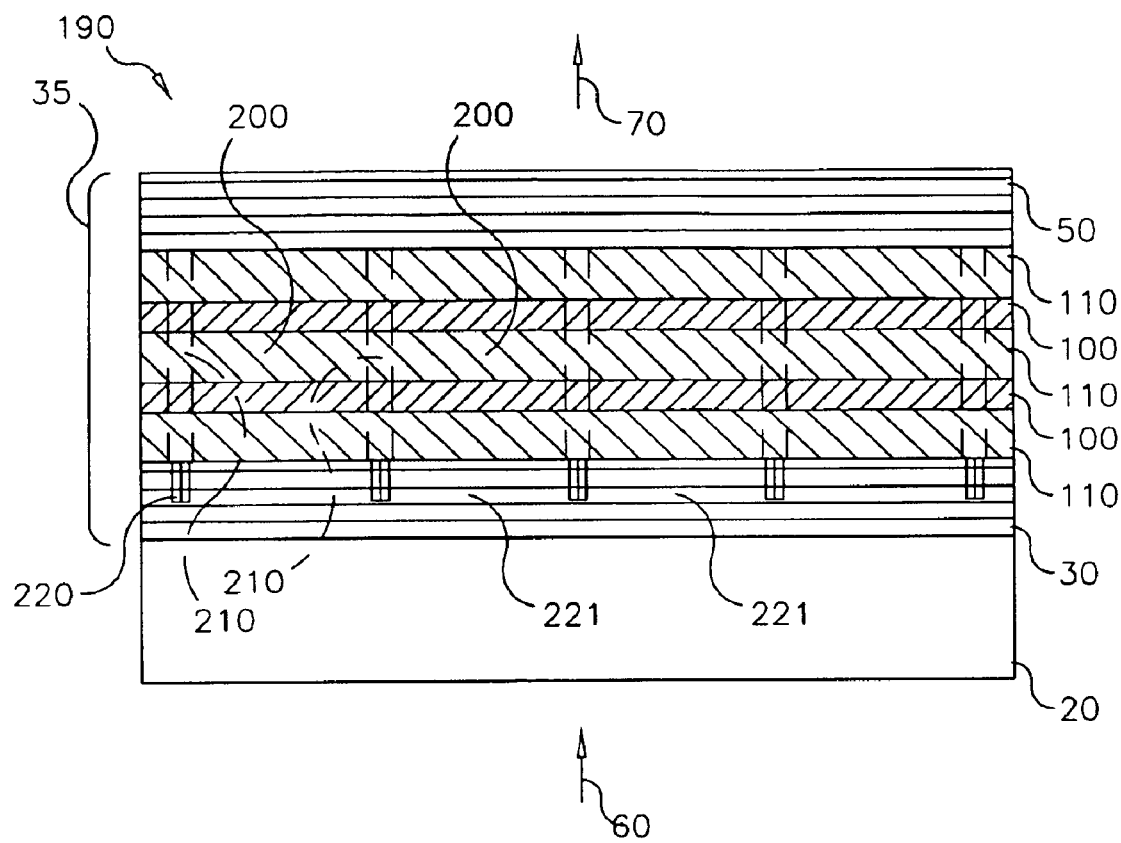
FIG. 3 is a schematic cross-sectional view of a vertical cavity organic laser device using a phase-locked array.

The laser can be increased in an area while maintaining a degree of spatial coherence, by utilizing the phase-locked organic laser array 190 as depicted in FIG. 3. In order to form a two-dimensional phase-locked laser array 190, the organic laser film structure 35 is patterned to form laser pixels 200, which are separated by inter-pixel regions 210. Laser pixels 200 are created by weakly confining the laser light to inter-pixel regions 210, by either small amounts of built-in index or gain guiding, or by modulating the reflectance of at least one of the mirrors. In one embodiment the reflectance modulation was affected by patterning and forming an etched region 220 in the first dielectric stack 30, using standard photolithographic and etching techniques, thus forming a two-dimensional array of circular pillars on the surface of the first dielectric stack 30. The remainder of the organic laser microcavity structure is deposited upon the patterned first dielectric stack 30 as described above. In the same embodiment, the shape of the laser pixels 200 is circular; however, other pixel shapes are possible, such as rectangular.

The dimensions of the laser pixels 200 are critical for determining the lateral modes supported by the laser pixels 200. For the case of index-guided structures, the number of lateral modes supported are dictated by well-known rules governing optical waveguides (see "Theory of Dielectric Waveguides," by H. Kogelnik, Chapter 2 of "Integrated Optics," Edited by T. Tamir, 1979). For gain-guided structures, the number of lateral modes supported are dictated by the degree of overlap between the supported cavity modes and the gain profile. For reflectance-modulated structures, the number of lateral modes supported are determined by the dimensions of the mirror structure, related to the diffraction loss experienced by a given mode (see "Resonant Modes in a Maser interferometer," by A. G. Fox and Tingye Li, B. S. T. J., Vol. 40, pages 453–458, March 1961). Depending on the guiding structure, a critical dimension exists, below which only a single transverse mode is supported, and above which a plurality of transverse modes are supported. These principles apply to laser systems in general, and are not specific solely to an organic laser structure.

To obtain phase locking, intensity and phase information must be exchanged amongst the laser pixels 200. To accomplish this, the inter-pixel spacing should be in the range of 0.25 to 4 µm. Phase-locked array operation also occurs for larger inter-pixel spacings; however, it leads to inefficient usage of the optical-pumping energy. To obtain stable phase-locking, the laser pixels 200 are preferred to support only the fundamental lateral mode. To accomplish this, the lateral dimension (e.g. diameter for a circular lasing pixel) is preferred to be 5 µm or smaller. The etch depth is preferred to be from 200 to 1000 nm deep to form etched region 220. By etching just beyond an odd number of layers into the first dielectric stack 30, it is possible to affect a significant shift of the longitudinal mode wavelength in the etched region 220 away from the peak of the gain media. Hence, lasing action is prevented and spontaneous emission is significantly reduced in the inter-pixel regions 210. The end result of the formation of etched region 220 is that the laser emission is weakly confined to the laser pixels 200, no lasing originates from the inter-pixel regions 210, and coherent phase-locked laser light is emitted by the array 190.

Figure 4:
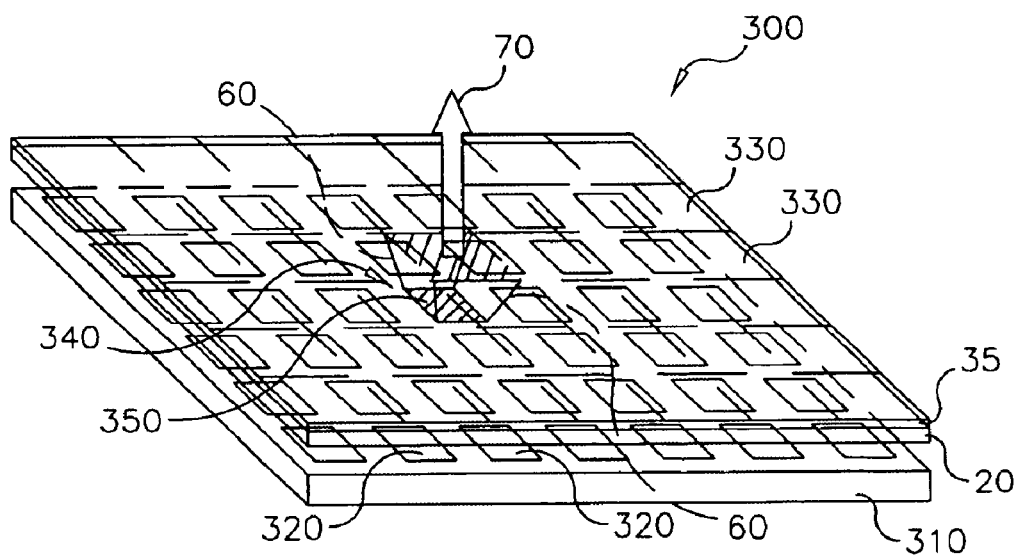
FIG. 4 is a cut-away perspective view of an organic VCSEL array.

FIG. 4 shows another advantage of organic VCSEL devices; they can be easily fabricated into arrays of individually-addressable elements. FIG. 4 shows a perspective view of an organic VCSEL array 300. The organic VCSEL array 300 comprises a pump source array 310, which includes a plurality of pump array elements 320. The pump array elements 320 are sources of photons with wavelength and power density useful for pumping the organic VCSEL array 300. A useful example of the pump source array 310 is an array of colored LEDs. Above the pump source array 310, the substrate 20 is provided, upon which is deposited the organic laser film structure 35. The organic laser film structure 35 can be any of the embodiments discussed earlier in regards to FIGS. 1 through 3.

The arrangement of the pump source array 310 defines a plurality of organic laser elements 330. A single organic laser element 330 in the organic VCSEL array 300 is the area pumped by a single pump array element 320. The organic laser elements 330 can be individually addressable by individually addressing the pump array elements 320. This is depicted in FIG. 4, in which a single activated organic laser element 340 is shown. The activated organic laser element 340 comprises an activated pump element 350, which emits a pump beam 60. The pump beam 60 excites the organic gain material in the region of the activated organic laser element 340 above threshold. This causes laser light 70 to be emitted substantially normal to the plane of the organic laser film structure 35 within the area of the activated organic laser element 340.

In the organic VCSEL array 300, each organic laser element 330 is preferred to be incoherent with neighboring organic laser elements 330. This can be accomplished by either defining a gap of more than 10 µm between the laser pixels 200 of adjacent organic laser elements 330. Alternatively, the pump source array 310 can be made to leave unpumped regions between adjacent organic laser elements 330. Hence, the laser light 70 emitted by the entire organic VCSEL array 300 will have a degree of spatial incoherence. This is true even if a phase-locked array structure is used for the organic laser film structure 35, in which case the output of individual organic laser elements 330 could be diffraction-limited. The etendue of the entire organic VCSEL array 300 in this case, though, would be at least N times the diffraction-limited etendue, N being the number of organic laser elements 330 in the organic VCSEL array 300. The spatial incoherence is useful for display systems, as it reduces the appearance of laser speckle. The organic laser elements 330 can also comprise multiple host-donor combinations and/or multiple cavity designs such that a number of wavelengths could be produced by a single array.

Figure 5:
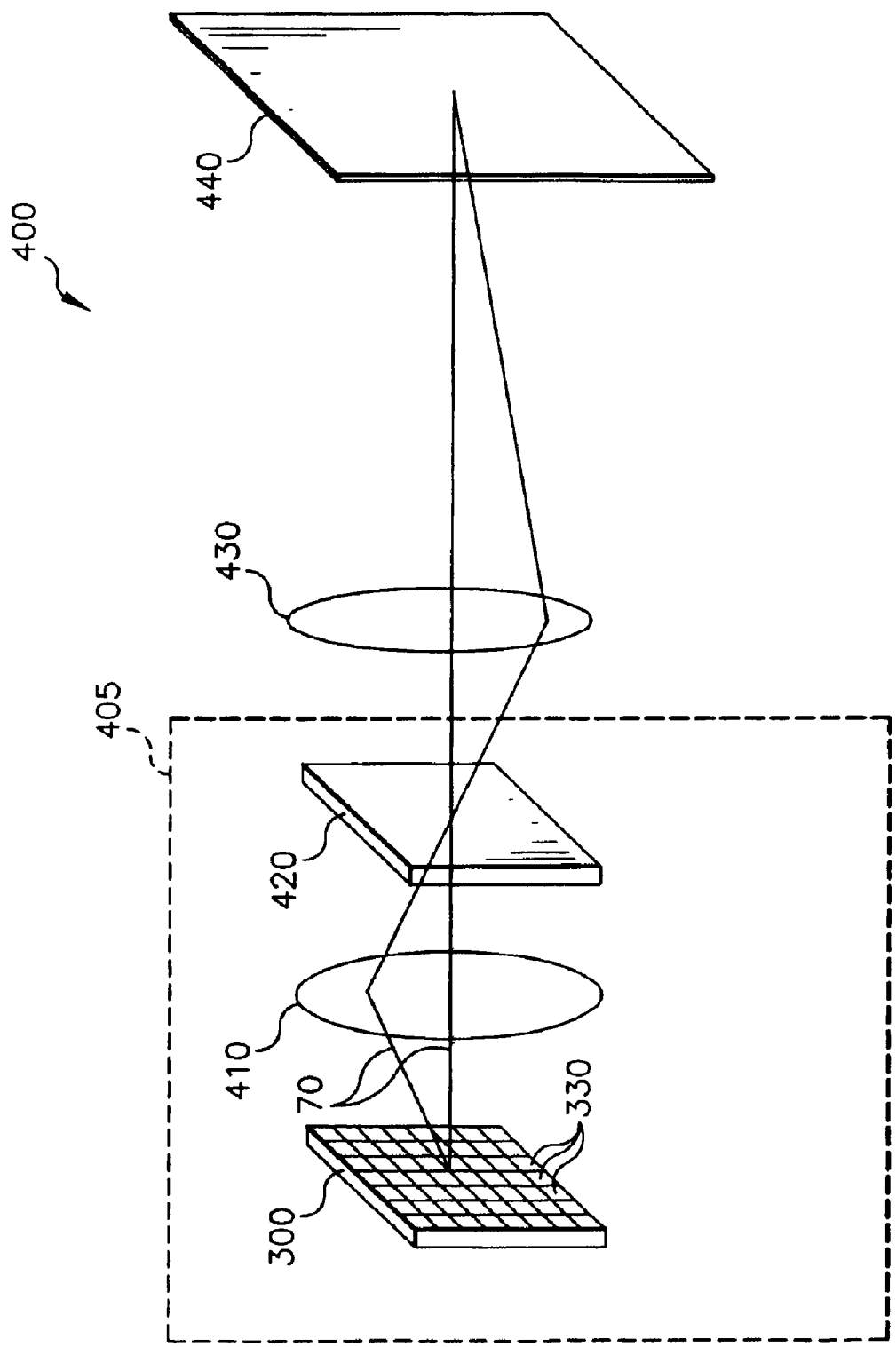
FIG. 5 is a schematic perspective view of an electronic imaging system of the present invention.

FIG. 5 shows the electronic imaging system of the present invention. The electronic imaging system 400 is shown in a schematic perspective view in FIG. 5. The electronic imaging system 400 comprises a modulation optical system 405 that creates an image, and a projection lens 430 that projects the image onto a target plane 440. The image is a two-dimensional pattern of modulated light intensity. The electronic imaging system 400 as shown suggests a single color image, although the invention is not limited to use of a single color. Specific embodiments of imaging systems using three colors are depicted in FIGS. 13 through 17.

The modulation optical system 405 includes an organic VCSEL array 300, which comprises individual organic laser elements 330 that emit laser light 70, and are arrayed over an area. An area light valve 420 is provided to modulate the laser light 70 with data to generate the image. The data can include, but is not limited to, pictorial image data useful in a projection display or image printer. Alternatively, text data as in a text printer or other data can be encoded on the image by intensity modulating the laser light 70 with the area light valve 420. Beam-shaping optics 410 are provided between the organic VCSEL array 300 and the area light valve 420 in order to receive the laser light 70 and produce a desired illumination profile on the area light valve 420.

The area light valve 420 comprises a two-dimensional array of individually operable light-modulating pixels arrayed in a rectangular geometry. Examples of a suitable area light valve 420 are transmissive or reflective liquid crystal display (LCD) panels available from JVC, Three-Five, Aurora, and Philips, and micromirror arrays such as the Digital Light Processing® (DLP®) chips available from Texas Instruments. For simplicity, the schematic view of FIG. 5 is suggestive of a transmissive light valve. However, it is noted that the area light valve 420 can be reflective and still be within the scope of the invention. Detailed descriptions of embodiments using reflective light valves are provided regarding FIGS. 11 and 12.

The area light valve 420 shown in FIG. 5 further requires analyzing optics (not shown) in order to modulate the light beam. For example, liquid crystal light valves require polarization optics to selectively remove polarization components from the laser light 70. Alternatively, polarized laser light 70 can be produced directly by the organic VCSEL array 300 through the use of asymmetric laser pixels 200 (shown in FIG. 3), and other means. As another example, micromirror arrays require a beam stop or an optomechanical architecture that allows only light deflected into a desired solid angle to contribute to the image.

The specific use of the image at the target plane 440 depends on the application for the present invention. In a display system, a display screen will be placed at the target plane 440 to create a viewable image. The display screen in a rear-projection display system would take the form of a transparent material characterized by a degree of diffusion to provide a desired field-of-view in both the horizontal or vertical directions. The transparent material might be glass or plastic, or a combination of a substrate and a diffusing film. The diffusion may be provided by an etched surface, a holographic surface, or a scattering film. The display screen in a front-projection display system would take the form of a reflective material with diffusing properties, for example a matte screen. In an electrophotographic printing system, the target plane 440 would correspond to the location of an electrophotographic drum or plate upon which a print medium is sent through a toner station. In an AgX-based printing system, a photosensitive print medium would be located at the target plane 440, and would be subsequently developed to reveal the image.

In the simplest embodiment, shown in FIG. 5, the beam-shaping optics 410 comprises a lens that images the organic VCSEL array 300 onto the area light valve 420. The VCSEL array 300 is preferred to have the same aspect ratio as the area light valve 420. Alternatively, a different aspect ratio could be used and the beam-shaping optics 410 could produce an anamorphic image of the organic VCSEL array 300. The magnification of the beam-shaping optics 410 should be chosen to match the area of the image of the organic VCSEL array 300 to the area of the area light valve 420. Some overfill is desirable in order to remove edge effects in the illumination and provide for mechanical tolerance. The image of the VCSEL array 300 can be defocused slightly in order to remove unwanted pixellation effects that might arise from dark regions between individual organic laser elements 330.

This embodiment has two significant advantages. First, because a given location on the area light valve 420 receives light primarily from only one organic laser element 330 on the organic VCSEL array 300, the illumination intensity at that location is controllable by modulating the organic laser element 330. Thus, the organic laser elements 330 can be driven at different output levels in order to produce a uniform image. This could be used to compensate for nonuniformities in the area light valve 420 or the organic VCSEL array 300, or to compensate for radiometric $\cos^4$ fall-off in the image produced at the target plane 440.

The second advantage of imaging the organic VCSEL array 300 onto the area light valve 420 is that letterboxing can be applied with improved performance. Letterboxing is a technique whereby a number of different aspect ratios can be produced from a given area light valve by disabling rows or columns of light-modulating pixels as necessary to effectively alter the aspect ratio of the image. In prior art systems, the entire light valve is illuminated to avoid complex switching of illumination optics as would be required to illuminate only the desired light-modulating pixels. Any real-world light valve allows some small proportion of light to pass through the disabled light-modulating pixels, resulting in flare in the letterboxed regions of the image. Such flare can be eliminated from the electronic imaging system 400 by not pumping the organic laser elements 330 that would illuminate the disabled light-modulating pixels on the area light valve 420.

Alternatively, a nonimaging architecture can be used for the beam-shaping optics 410. In this case, the organic VCSEL array 300 is not imaged onto the area light valve 420. As a trivial example, the organic VCSEL array 300 can be placed at a given distance from the area light valve 420, with the laser light 70 being allowed to propagate to produce a given intensity distribution at the area light valve 420. While the simplicity of such an approach is attractive, the distance required in practical reflective light valve systems makes it difficult to achieve a uniform illumination profile. In many ways it is preferable to illuminate the full area of the area light valve 420 with light from every organic laser element 330, rather than mapping the light from an organic laser element 330 to a given portion of the area light valve 420. The illumination then has built-in redundancy against the failure of one or more organic laser elements 330. This, however, means that the organic laser elements 330 should be mutually incoherent so that they can be overlapped without introducing significant interference fringes in the light profile at the area light valve 420.

Figure 6:
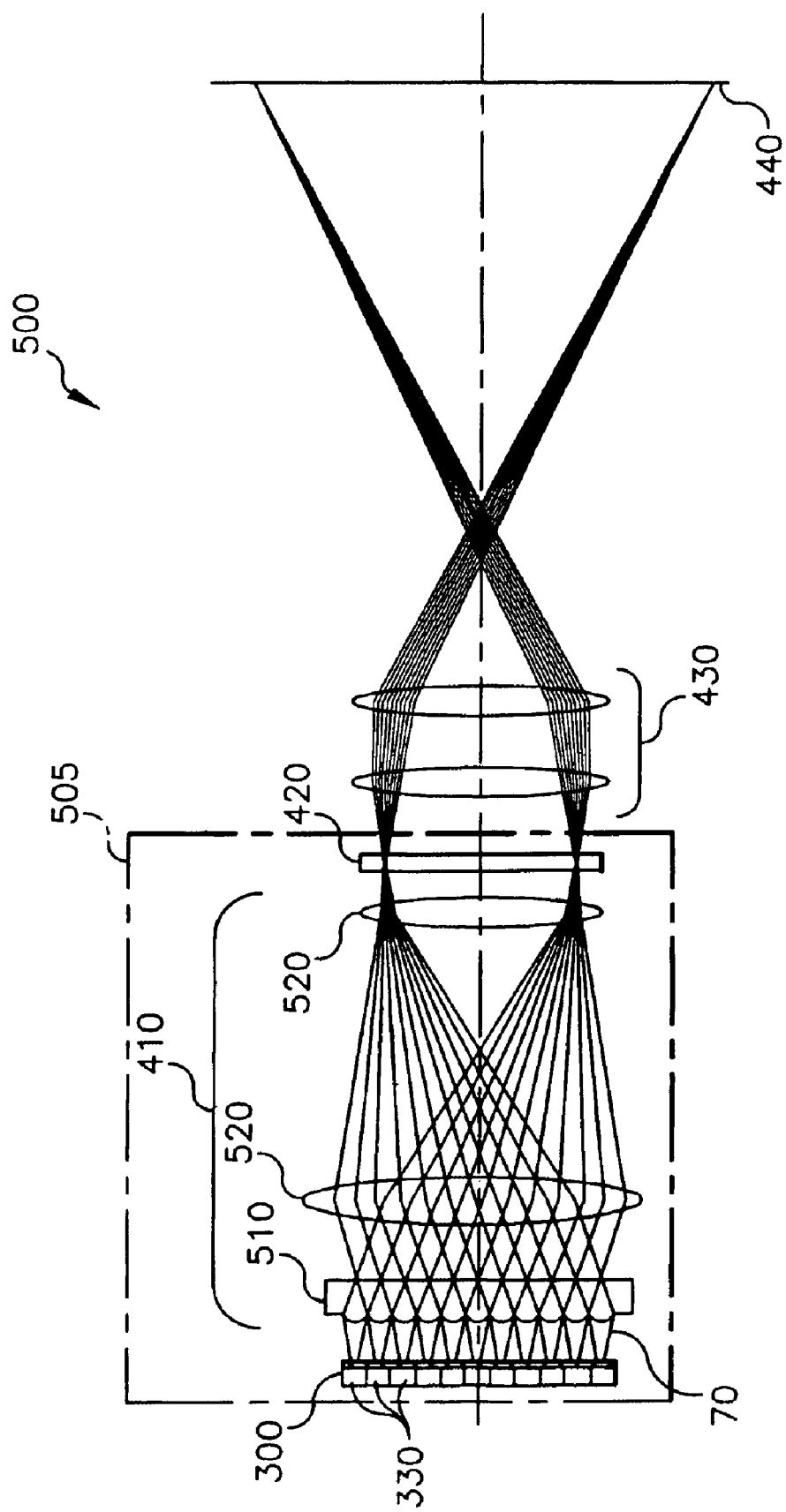
FIG. 6 is a cross-sectional view of an electronic imaging system using a lenslet array to overlap the outputs of an organic VCSEL array.

An example of an electronic imaging system using beam-shaping optics that overlap the light from the organic laser elements is shown in FIG. 6. FIG. 6 is a cross-sectional view of an electronic imaging system 500 that uses a lenslet array with an array of vertical cavity organic lasers. The electronic imaging system 500 comprises a modulation optical system 505 that creates an image comprising a two-dimensional intensity pattern, and a projection lens 430 that projects the image onto a target plane 440. The modulation optical system 505 comprises an organic VCSEL array 300, which comprises individual organic laser elements 330 that emit laser light 70 and are arrayed over an area. An area light valve 420 is provided to modulate the laser light 70 with data to generate the image. Beam-shaping optics 410 are provided between the organic VCSEL array 300 and the area light valve 420 in order to receive the laser light 70 and produce a desired illumination profile on the area light valve 420.

The beam-shaping optics 410 comprise a combiner lenslet array 510 that accepts the laser light 70. The laser light 70 emitted from each individual organic laser element 330 is collected by a single lenslet to form a nominally collimated beam. A combiner field lens 520 collects each of the collimated beams and forms magnified images of each organic laser element 330 that are overlapped onto each other at the area light valve 420. The combiner field lens 520 is preferred to be telecentric for liquid-crystal light valves, but may converge to a pupil beyond the area light valve 420 for other embodiments.

If each of the organic laser elements 330 provide emitted light profiles that are uniform (or nearly so), the modulation optical system 505 will provide a uniform illumination of the area light valve 420. Alternatively, if the emitted light profiles are non-uniform with a random pattern of emitted light non-uniformity from one organic laser element 330 to the next, then the modulation optical system 505 could result in a uniform illumination of the area light valve 420 through averaging. If however, the emitted light profiles have pattern nonuniformity, such as a general fall-off at the edges of the organic laser elements 330, then the fall-off is replicated, although averaged, in the illumination of the area light valve 420. If the fall-off exceeds the uniformity tolerance for the application, the problem can be corrected by overilluminating the area light valve 420 or by the use of light uniformization optics (such as a fly's eye integrator or an integrating bar).

As such, light uniformization optics intermingle the laser light 70 from a given organic laser element 330 with itself. It is preferred that the emitted laser light 70 from that organic laser element 330 be multi-mode and sufficiently incoherent (or partially coherent) that overlapping can occur without, again, introducing significant interference fringes in the resulting illumination. As a result, an organic laser array 300 used with a uniformizer, preferentially, comprises organic laser elements 330 that are individually multimode, as well as being mutually incoherent. This can be accomplished, for example, by using organic laser elements 330 that are not phase-locked arrays, or that are phase-locked arrays comprising multimode lasing pixels. Alternatively, individual single-mode coherent organic laser elements 330 can be used with an integrator by including an element that reduces spatial coherence. An example of a coherence-reducing element is a diffuser. The diffuser, however, should be rotated or vibrated in the optical path between the organic laser array 300 and the integrator optics in order to average out speckle induced by the optically rough diffuser surface. Finally, single-mode organic laser elements 330 may be usable if there are a large number of them and they are mutually incoherent. In this case, if the coherence artifacts induced by each organic laser element 330 are not aligned on the area light valve 420, the coherence artifacts will be unnoticeable due to averaging.

Figure 7:
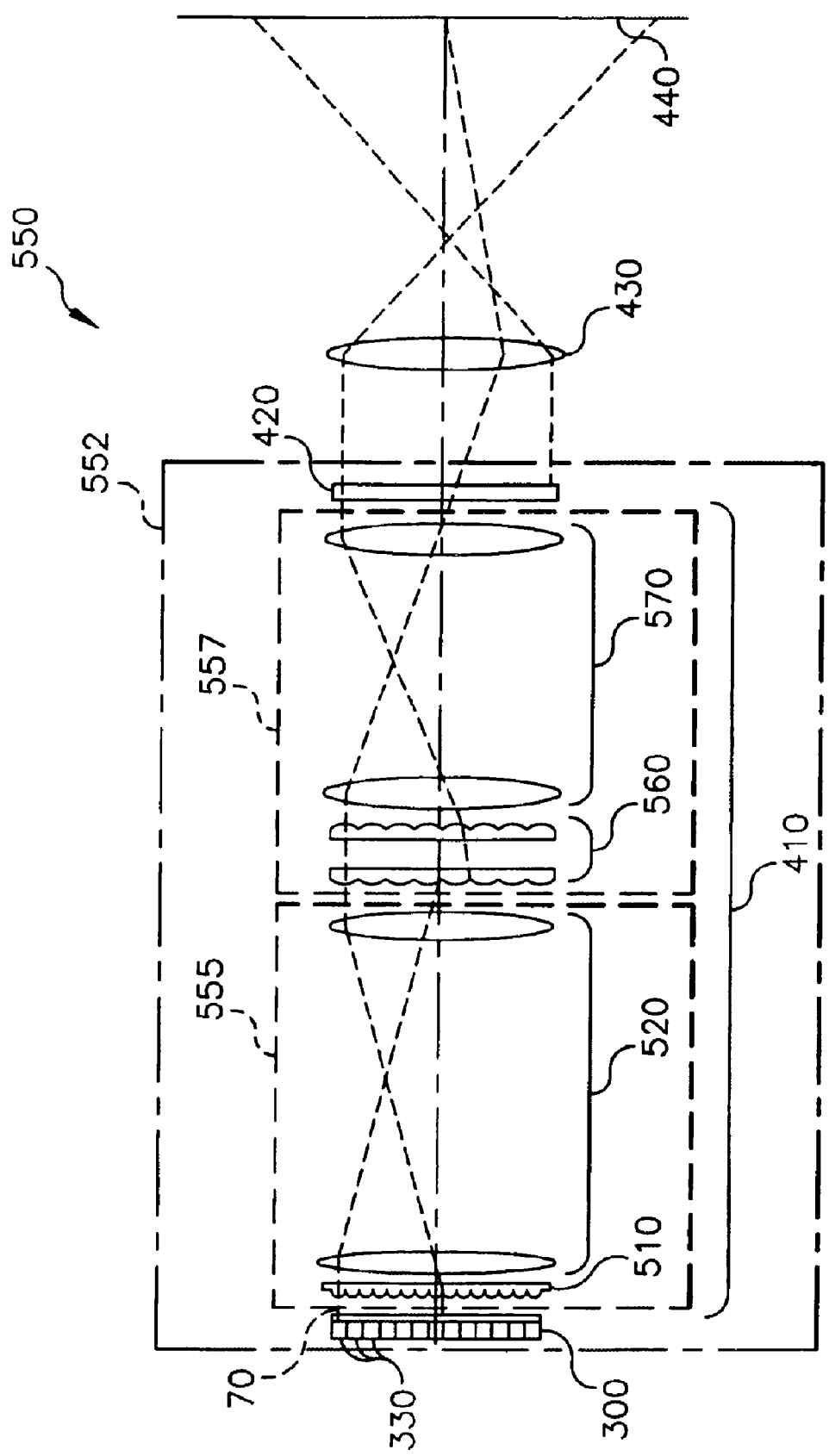
FIG. 7 is a cross-sectional view of an electronic imaging system using an integrating bar with an array of vertical cavity organic lasers.

An example of an electronic imaging system using beam-shaping optics that include an integrator is shown in FIG. 7. FIG. 7 shows a cross-sectional view of an electronic imaging system 550 that includes a fly's eye integrator. The electronic imaging system 550 comprises a modulation optical system 552 that creates an image comprising a two-dimensional intensity pattern, and a projection lens 430 that projects the image onto a target plane 440. The modulation optical system 552 comprises an organic VCSEL array 300, which comprises individual organic laser elements 330 that emit laser light 70 and are arrayed over an area. An area light valve 420 is provided to modulate the laser light 70 with data to generate the image. Beam-shaping optics 410 are provided between the organic VCSEL array 300 and the area light valve 420 in order to receive the laser light 70 and produce a desired illumination profile on the area light valve 420.

The beam-shaping optics 410 comprise a lenslet combiner system 555 and a fly's eye integrator 557. The lenslet combiner system 555 comprises a combiner lenslet array 510 followed by a combiner field lens 520. The combiner lenslet array 510 and the combiner field lens 520 accept the laser light 70 and form magnified, overlapped images of the individual organic laser elements 330 at the entrance of the fly's eye integrator 557.

The fly's eye integrator 557 comprises a matched pair of lenslet arrays 560 and fly's eye coupling optics 570. As is well understood in the art, a fly's eye integrator breaks an input light beam into a number of smaller beamlets, and then overlaps images of the beamlets to create uniform illumination. In the fly's eye integrator shown in FIG. 7, the matched pair of lenslet arrays 560 perform the task of breaking up the light provided by the lenslet combiner system 555 into beamlets. The fly's eye coupling optics 570 perform the task of reimaging the beamlets (actually, the fields at the entrance to the first of the matched pair of lenslet arrays 560) in an overlapping manner at the area light valve 420. The fly's eye coupling optics 570 is preferred to be telecentric for liquid-crystal light valves, but may converge to a pupil beyond the area light valve 420 for other embodiments. In order to efficiently use the light produced by the organic VCSEL array 300, the fly's eye integrator should produce an image that matches the aspect ratio of the desired illumination of the area light valve 420 (with a slight overfill for alignment tolerance). This is most easily accomplished by matching the aspect ratio of the individual lenslets in the matched pair of lenslet arrays 560 to the aspect ratio of the desired illumination of the area light valve 420. Note that the aspect ratio of the desired illumination does not necessarily match the aspect ratio of the area light valve 420, for example when using letterboxing.

Figure 8:
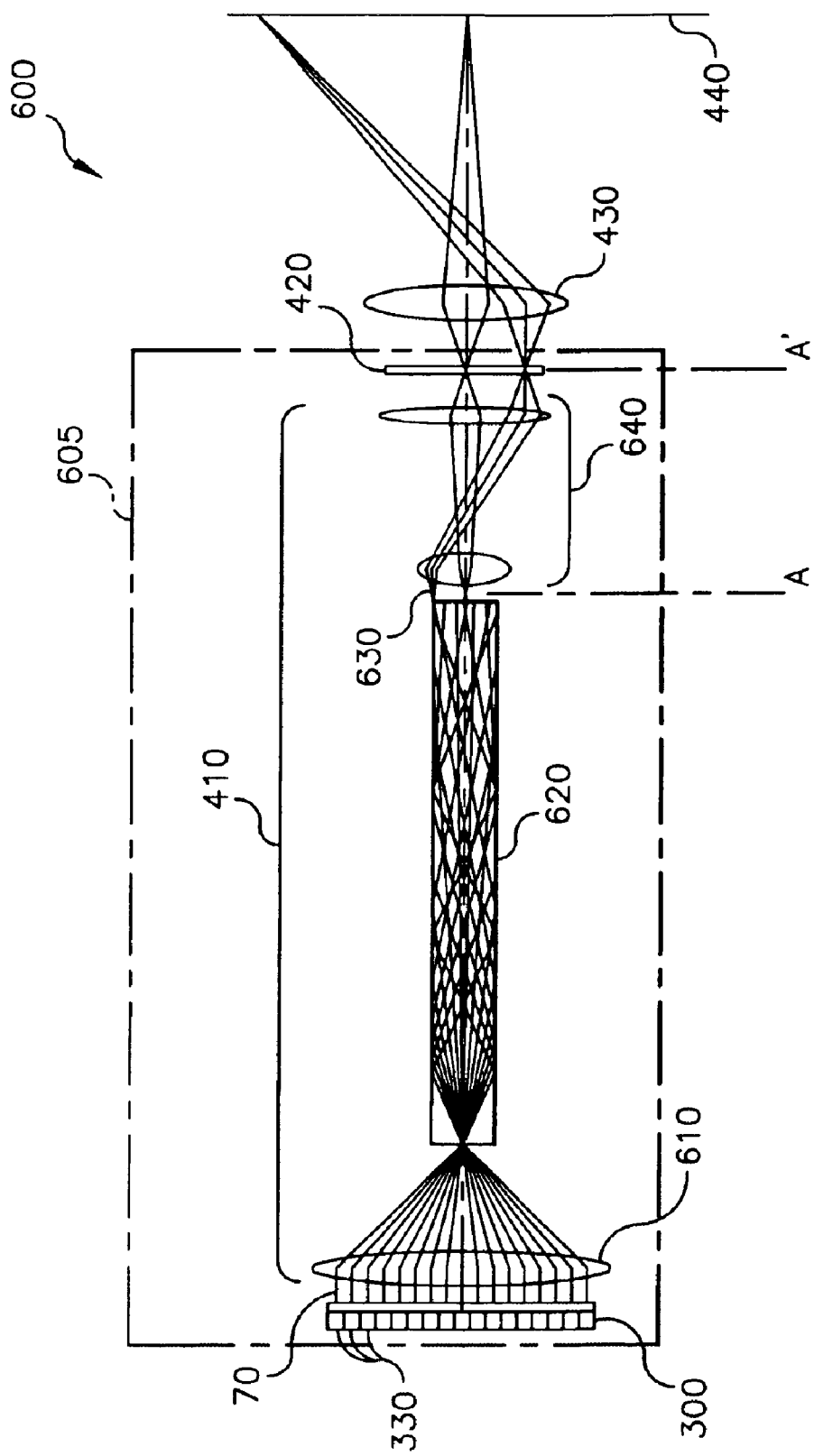
FIG. 8 is a cross-sectional view of an electronic imaging system using an integrating bar with an array of vertical cavity organic lasers.

Another embodiment of the electronic imaging system, using homogenizing beam-shaping optics, is shown in FIG. 8. FIG. 8 is a cross-sectional view of an electronic imaging system 600 that uses a light pipe integrator with an array of vertical cavity organic lasers. The electronic imaging system 600 comprises a modulation optical system 605 that creates an image comprising a two-dimensional intensity pattern, and a projection lens 430 that projects the image onto a target plane 440. The modulation optical system 605 comprises an organic VCSEL array 300, which comprises individual organic laser elements 330 that emit laser light 70 and are arrayed over an area. An area light valve 420 is provided to modulate the laser light 70 with data to generate the image. Beam-shaping optics 410 are provided between the organic VCSEL array 300 and the area light valve 420 in order to receive the laser light 70 and produce a desired illumination profile on the area light valve 420.

The beam-shaping optics 410 is a light pipe integrator that provides uniform illumination of the area light valve 420. The beam-shaping optics 410 comprise a condensing lens 610 that accepts the laser light 70 emitted by the organic VCSEL array 300 and focuses it into the entrance of an integrating bar 620. The laser light 70, confined in the integrating bar 620 due to total internal reflection as it propagates down the bar's length, produces homogenized light 630 after a sufficient propagation length. The homogenized light 630 exits the integrating bar 620 at plane A. Light pipe optics 640 are provided that image plane A to a conjugate plane A'. The area light valve 420 is placed at or near the plane A'.

The integrating bar 620 is a length of optical-quality glass or plastic with a rectangular cross-section. Preferred materials are BK7, fused silica, or other optical glasses. The aspect ratio of the cross-section of the integrating bar 620 preferably matches the aspect ratio of the desired illumination of the area light valve 420, in which case the light pipe optics 640 can comprise only spherical lens elements. Note that the aspect ratio of the desired illumination does not necessarily match the aspect ratio of the area light valve 420, for example, when using letterboxing. A different aspect ratio can be used for the cross-section of the integrating bar 620, but this would necessitate using anamorphic light pipe optics 640. The integrating bar 620 is shown as being straight and having a constant width over its entire length. However, the integrating bar 620 can be tapered or bent and still be within the scope of the invention.

Figure 9:
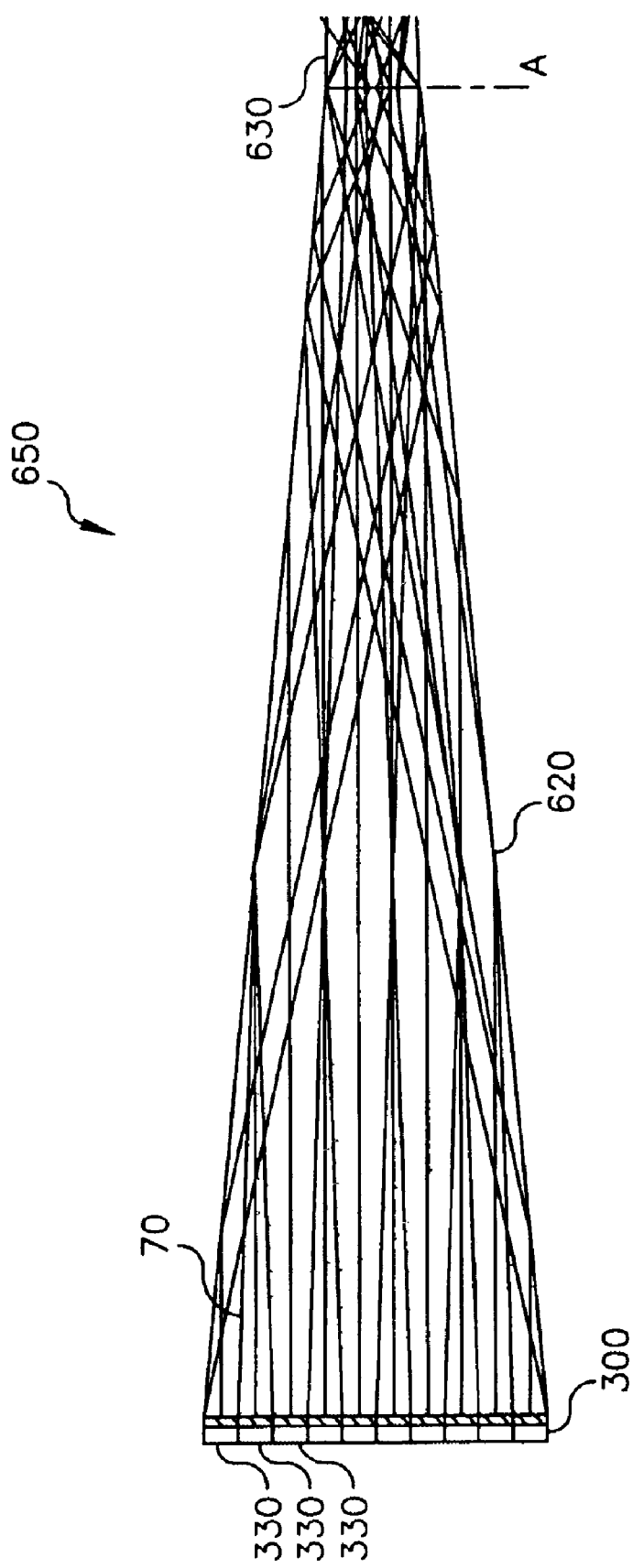
FIG. 9 is a cross-sectional view of an organic VCSEL array directly integrated with an integrating bar.

FIG. 9 shows a cross-section of a monolithic integrator 650. The monolithic integrator 650 comprises an organic VCSEL array 300 provided directly onto the entrance facet of an integrating bar 620. The organic VCSEL array 300 comprises individual organic laser elements 330 that emit laser light 70 and are arrayed over an area, and therefore directly launch laser light 70 into the integrating bar 620.

The integrating bar 620 is preferably tapered such that its cross-sectional area shrinks as the laser light 70 propagates. This effectively causes the laser light 70 from the different organic laser elements 330 to intermix to produce homogenized light 630 at the exit facet of the integrating bar 620 (image plane A).

To produce the monolithic integrator 650, the organic VCSEL array could be fabricated on a separate substrate as shown in FIG. 4, with the substrate subsequently affixed to the integrating bar 620 with an optical cement.

For a display system using lasers, the appearance of laser speckle must always be a primary concern. Speckle arises due to the natural coherence of a laser source, which causes a complicated interference pattern to appear when the laser light scatters off an optically rough display screen. Among the numerous methods of reducing the visibility of laser speckle, one of the most attractive is the reduction of coherence, both temporal and spatial, of the laser source (see G. Parry, "Speckle Patterns in Partially Coherent Light," Ch. 3 in *Laser Speckle and Related Phenomena*, ed. J. C. Dainty, Springer, 1975). This technique is particularly well suited for use with the organic VCSEL array of the present invention.

The reduction of temporal coherence is enabled by the fact that organic gain materials of the present invention exhibit extremely large gain bandwidths compared with conventional laser materials. For example, Alq doped with the dopant DCM has been reported to have a gain bandwidth exceeding 100 nm (see S. Riechel et al., Optics Letters, Vol. 26, No. 9, May 1, 2001). Therefore, the possibility exists of producing lasers with a wide range of wavelengths using the same host-dopant combination. Referring to FIGS. 1 and 4, within an organic VCSEL array 300 having a uniform host-dopant combination, the laser wavelength can be varied between organic laser elements 330 by, for example, controllably varying the thickness of the organic active region 40. Because the longitudinal laser modes in a laser have wavelengths that are proportional to the cavity length, the varying active region thickness produces a laser wavelength that varies across the organic laser elements 330.

The ease with which the laser wavelength can be deliberately varied across the organic laser elements 330 is very advantageous in contrast to the difficulties encountered in attempting similar variations with semiconductor or solid-state laser arrays. As an example, U.S. Pat. No. 5,384,797 issued Jan. 24, 1995 to Welch et al., and titled "Monolithic Multi-Wavelength Laser Diode Array," describes a complex monolithic multi-wavelength laser diode array that includes an array of laser oscillators, coupled to an array of Bragg reflector gratings and then coupled both to a laser amplifier array and a frequency-doubling waveguide array, to thereby provide a multi-wavelength laser array with less flexibility in layout and wavelength than is provided by the organic VCSEL array 300.

Figure 10:
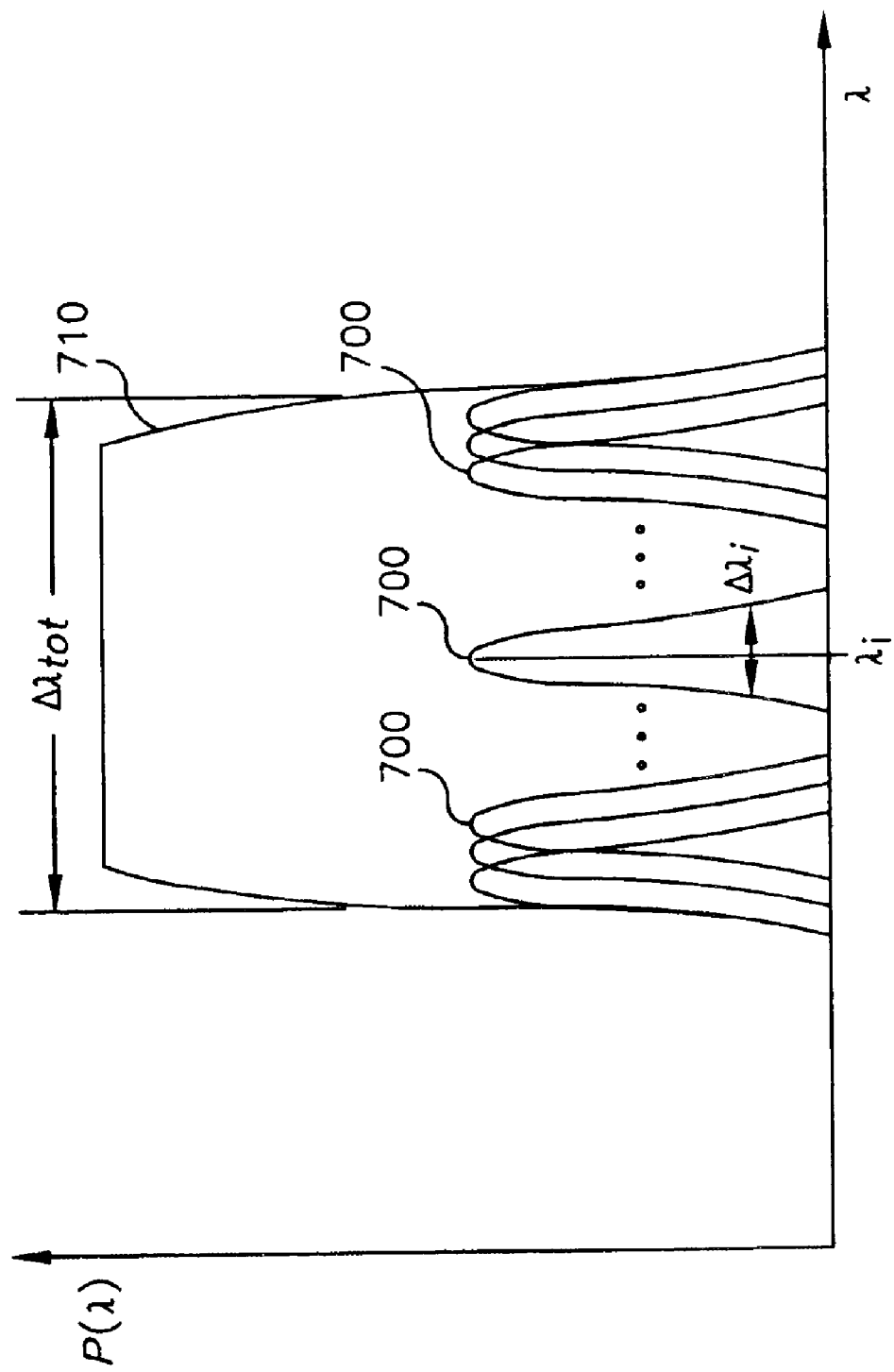
FIG. 10 is a diagram showing the use of overlapping laser spectra to reduce the spectral coherence of the array of vertical cavity organic lasers.

When utilizing beam shaping optics 410 that overlap the laser light 70 emitted by all the organic laser elements 330, a very wide spectral width can be achieved. This concept is illustrated in FIG. 10. FIG. 10 is a diagram showing the use of overlapping laser spectra to reduce the spectral coherence of an organic VCSEL array 300. Each organic laser element 330 has an individual laser spectrum 700 having a characteristic individual wavelength $\lambda_i$ and individual spectral width $\Delta\lambda_i$. The individual spectral widths $\Delta\lambda_i$ are determined, assuming a single-mode VCSEL design, by the finesse of the vertical cavity design. Very broad individual spectral widths $\Delta\lambda_i$ can result from a low-finesse vertical cavity design, as would result from using a second dielectric stack 50 and/or first dielectric stack 30 with low reflectivity (see FIG. 1). However, in order to achieve the low threshold pump density that enables LED pumping, the vertical cavity should have a high finesse, which would result in individual spectral widths $\Delta\lambda_i$ that are too narrow (<1 nm) to impact the visibility of speckle directly.

However, as previously noted, by varying the thickness of the organic active region 40 across the organic VCSEL array 300, the individual center wavelengths $\lambda_i$ can be made to vary among the individual organic laser elements 330. The effect of overlapping the laser light 70 emitted by all organic laser elements 330 is to generate a spectral band 710 that is the sum of all the individual laser spectra 700. The resulting spectral band 710 has a total spectral width $\Delta\lambda_{tot}$ that can be very broad (>>1 nm) and hence render the speckle virtually invisible for a display screen with sufficient surface roughness. A related technique has been disclosed using visible inorganic semiconductor lasers by Waarts et al. in International Patent Application No. WO 95/20811, titled "Laser Illuminated Display System."

The visibility of laser speckle is often quantified by the speckle contrast, which is defined as the ratio of the standard deviation of the intensity of the speckles normalized by the mean intensity. This is also equivalent to the inverse of the signal-to-noise ratio of the speckle noise. To quantifiably predict the effect on the appearance of laser speckle of using a plurality of wavelengths, we consider the case of a Gaussian spectral band 710 with spectral width $\sigma_k$, which has a power spectral density (S), that can be written according to Equation 1.

$$S(k) = \frac{1}{\sqrt{2\pi}\,k} e^{-(k-k_0)^2/2\sigma_k^2} \quad \text{(Equation 1)}$$

In Equation 1, $k=2\pi/\lambda$ is the wavenumber and $k_0=2\pi/\lambda_0$ is the average wavenumber, or the wavenumber at the center of the spectral band 710. Assuming the scattering surface to have a normal distribution characterized by the standard deviation, denoted as the surface roughness $\sigma_h$, the speckle contrast reduction due to temporal incoherence is given by Equation 2 (see Parry), $$C_T = [1+(2\sigma_k\sigma_z)^2]^{-1/4} \quad \text{(Equation 2)}$$

where the optical surface roughness (for a possible viewing screen) is defined as $\sigma_z=2\sigma_h$ for a reflective scattering surface and $\sigma_z=(n-1)\sigma_h$ for a transmissive scattering surface, and where n denotes the refractive index of the scattering surface. For example, considering a front-projection display screen with surface roughness $\sigma_h=50\,\mu m$, in order to reduce the contrast to 20%, we require $\sigma_k=0.125\,\mu m^{-1}$, which corresponds to a total spectral width $\Delta\lambda_{tot}=14$ nm (FWHM) for a center wavelength $\lambda_0=550$ nm.

The present invention also provides a means of reducing the spatial coherence of the laser source. Because the individual organic laser elements 330 are mutually incoherent, the entire array is spatially incoherent. Thus, considering the effective location of the source as the image of the source looking back into the electronic imaging system, Iwai and Asakura (see T. Iwai and T. Asakura, "Speckle Reduction in Coherent Information Processing," Proceedings of the IEEE, Vol. 84, No. 5, May 1996) have shown that the speckle contrast is given approximately by Equation 3.

$$C_S = \left[1 + \left(\frac{NA_{proj}}{NA_{obs}}\right)^2\right]^{-\frac{1}{2}} \quad \text{(Equation 3)}$$

where $NA_{proj}$ is the effective numerical aperture of the projector (approximately the angular width of the illumination of a given point on the area light valve 420, divided by the magnification of the projection lens 430) and $NA_{obs}$ is the numerical aperture of the observer's eye (approximately the observer's pupil radius divided by the observer distance from the screen). To express this in terms of the properties of the organic VCSEL array, we can make use of the fact that the Lagrange invariant of the electronic imaging system is approximately $NA_{proj}$ times the half-width of the image at the target plane, and we further assume that the optical system utilizes fully the light generated by the organic VCSEL array (i.e. that the Lagrange invariant of the system is approximately that of the organic VCSEL array). If we further consider the case where the organic VCSEL array 300 comprises a number $N_{LE}$ of identical organic laser elements 330 that each emit a beam with a beam quality factor $M^2$, the Lagrange invariant of the entire organic VCSEL array will be approximately equal to $N_{LE}M^2$ times the Lagrange for a diffraction-limited Gaussian beam, which is $\lambda/\pi$. Thus, the speckle contrast reduction due to the spatial coherence can be expressed in terms of the radius of the observer's pupil ($R_{eye}$), the observer's distance (expressed in number of screen widths, $N_{sw}$), the beam quality factor of the individual organic laser elements 330, ($M^2$) and the number of organic laser elements 330 ($N_{LE}$) as shown in Equation 4.

$$C_S \approx \left[1 + \left(\frac{2\lambda_0}{\pi}\frac{M^2 N_{sw}}{R_{eye}} N_{LE}\right)^2\right]^{-\frac{1}{2}} \quad \text{(Equation 4)}$$

As an example, consider a display system designed to be viewed from at least one screen-width distance, and using a green organic VCSEL array ($\lambda_0$=550 nm) of the present invention with organic laser elements that individually emit diffraction-limited Gaussian beams ($M^2$=1). Assuming the radius of the observer's pupil to be approximately 1.5 mm, Equation 4 suggests that $N_{LE}$=21,000 organic laser elements would be sufficient to obtain a speckle contrast of 0.2. Rather than producing such a large number of individually-operable organic laser elements, it would be preferred to design each laser pixel to produce a non-diffraction-limited beam, such that the total Lagrange of the organic VCSEL array 300 is at least approximately 20,000 times the diffraction limit. This is easily accomplished in practice by limiting the phase-locked area to a small region of each organic laser element 330, for example by inserting gaps in the phase-locked array. For example, by designing the organic laser elements 330 to emit non-diffraction-limited beams with $M^2 \sim 100$, only approximately 200 organic laser elements would be sufficient to achieve a significant speckle reduction.

In practice, both the reduction of spatial coherence and the reduction of temporal coherence could be used to reduce speckle in the electronic imaging system of the present invention, using the means discussed herein. Thus, the speckle can be reduced by virtue of both the processes described in Equations 2 and 3.

Figure 11:
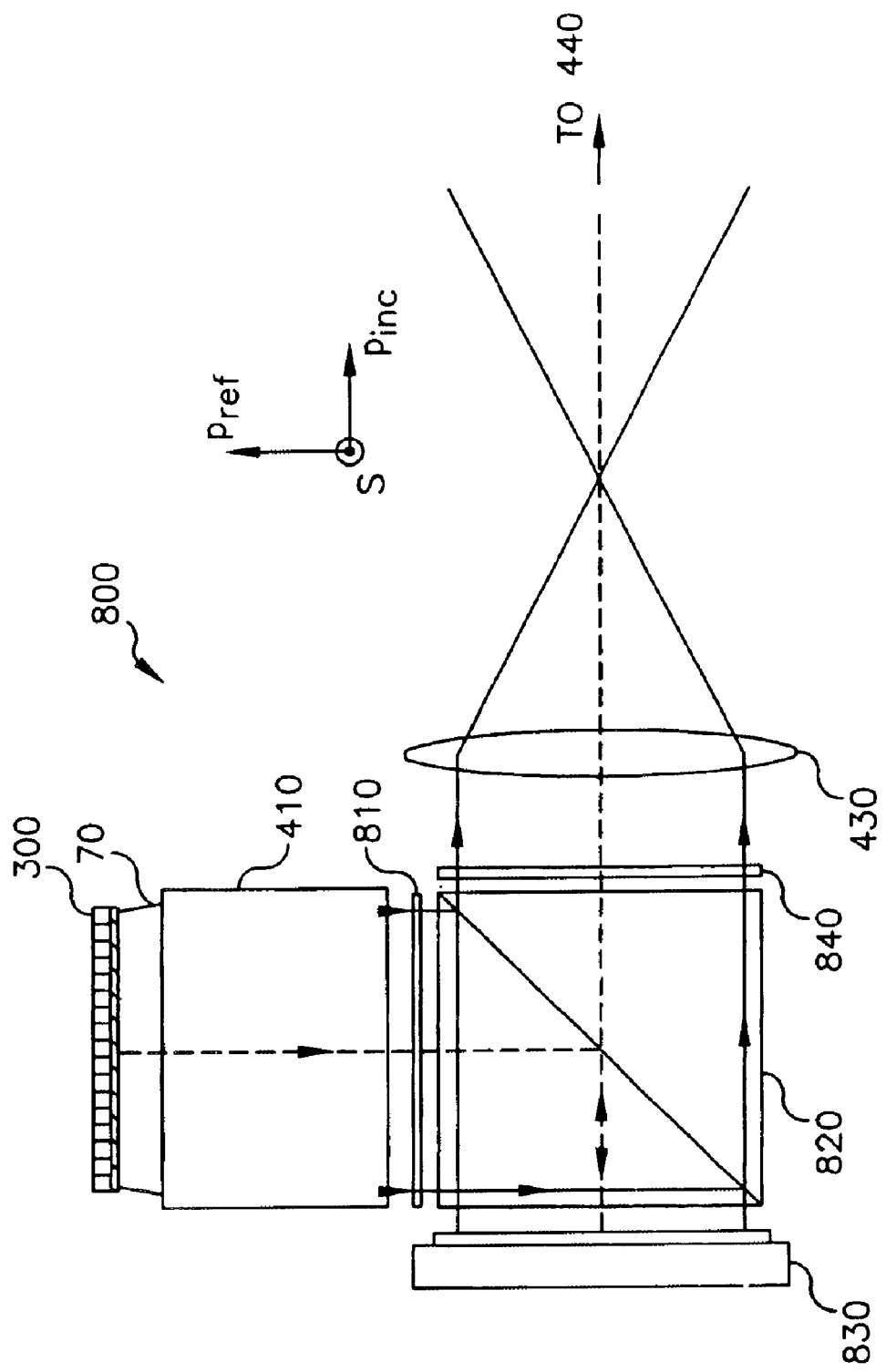
FIG. 11 is a cross-sectional view of a modulation optical system using an array of vertical cavity organic lasers with a reflective liquid-crystal light valve.

We now turn to embodiments of a modulation optical system using specific types of area light valves. FIG. 11 is a cross-sectional view of a modulation optical system 800 using an organic VCSEL array 300 with a reflective liquid-crystal light valve that emits laser light 70. Beam-shaping optics 410 are provided that produce an illumination profile that is uniform and matched in area to the desired illumination of a reflective liquid crystal light valve 830. Note that the desired illumination area does not necessarily correspond to the full area of the reflective liquid crystal light valve 830. Any of the embodiments for the beam shaping optics 410 that were discussed in describing FIGS. 5 through 9 can be used. The reflective liquid crystal light valve 830 is preferably a liquid-crystal on silicon (LCOS) chip, because of the manufacturability and electronics integration advantages of that architecture. The reflective liquid crystal light valve 830 can be a vertically-aligned nematic (VAN) LCOS design, such as the D-ILA® chips available from JVC or a twisted nematic LCOS design. The reflective liquid-crystal light valve 830 receives light that is polarized in an s-direction. The individually operable light-modulating pixels contribute a controllable amount of retardance in response to an applied voltage. Light reflected from a light-modulating pixel can have a linear polarization in the s-direction (as defined in FIG. 11) to produce a black region of the image, a linear polarization in the $p_{ref}$-direction (as defined in FIG. 11) that would produce a bright region of the image, or an elliptical or partially rotated linear polarization that would produce an intermediate level of the image.

A polarizing beam splitter 820 is provided between the beam-shaping optics 410 and the reflective liquid crystal light valve 830. The polarizing beam splitter 820 can be a cemented cube or a plate beam splitter that includes a dichroic polarization-sensitive coating or a wire-grid array. Dichroic polarizing beam splitter cubes and plates are available from Newport in Irvine, Calif. And many other optics vendors, while wire-grid polarizing beam splitters are available from Moxtek in Orem, Utah. The laser light 70 is preferred to be linearly polarized, but can be unpolarized or otherwise polarized (e.g. circular or elliptical), if a prepolarizer 810 is included between the organic VCSEL array 300 and the polarizing beam splitter 820. Alternatively, an unpolarized organic VCSEL array 300 can be used without a prepolarizer 810, if the extinction ratio of the polarizing beam splitter 820 exceeds the required contrast by a sufficient safety margin. The extinction ratio for this application is defined as the ratio of the reflectivity for s-polarized light to the reflectivity of p-polarized light of the polarizing coating.

The polarizing beam splitter 820 receives laser light 70 and reflects the s-polarized component (with polarization parallel to the coating plane) and transmits the $p_{inc}$-polarized component, which is unused and can be blocked with a beam stop (not shown). If a prepolarizer 810 is used, it will substantially remove the $p_{inc}$-polarized component of the laser light 70. Upon reflection with polarization change from the reflective liquid crystal light valve 830, the polarizing beam splitter 820 reflects the s-polarized component back toward the organic VCSEL array 300 while transmitting the $p_{ref}$-component toward an analyzer 840. The analyzer 840 is a linear polarizer that further filters any residual s-polarized light from the beam. A projection lens 430 is shown in order to use the modulation optical system 800 in an electronic imaging system that projects the image onto a target plane 440.

Note that the modulation optical system 800 has been described in one particular arrangement, using incident s-polarized light with the reflective liquid crystal light valve 830 arranged to receive light reflected by the polarizing beam splitter 820. Alternative arrangements are also possible, such as using incident p-polarized light with the reflective liquid crystal light valve 830 arranged to receive light transmitted through the polarizing beam splitter 820, and with the analyzer 840 and projection lens 430 disposed to receive s-polarized light reflected from the reflective liquid crystal light valve 830 and the polarizing beam splitter 820.

Figure 12:
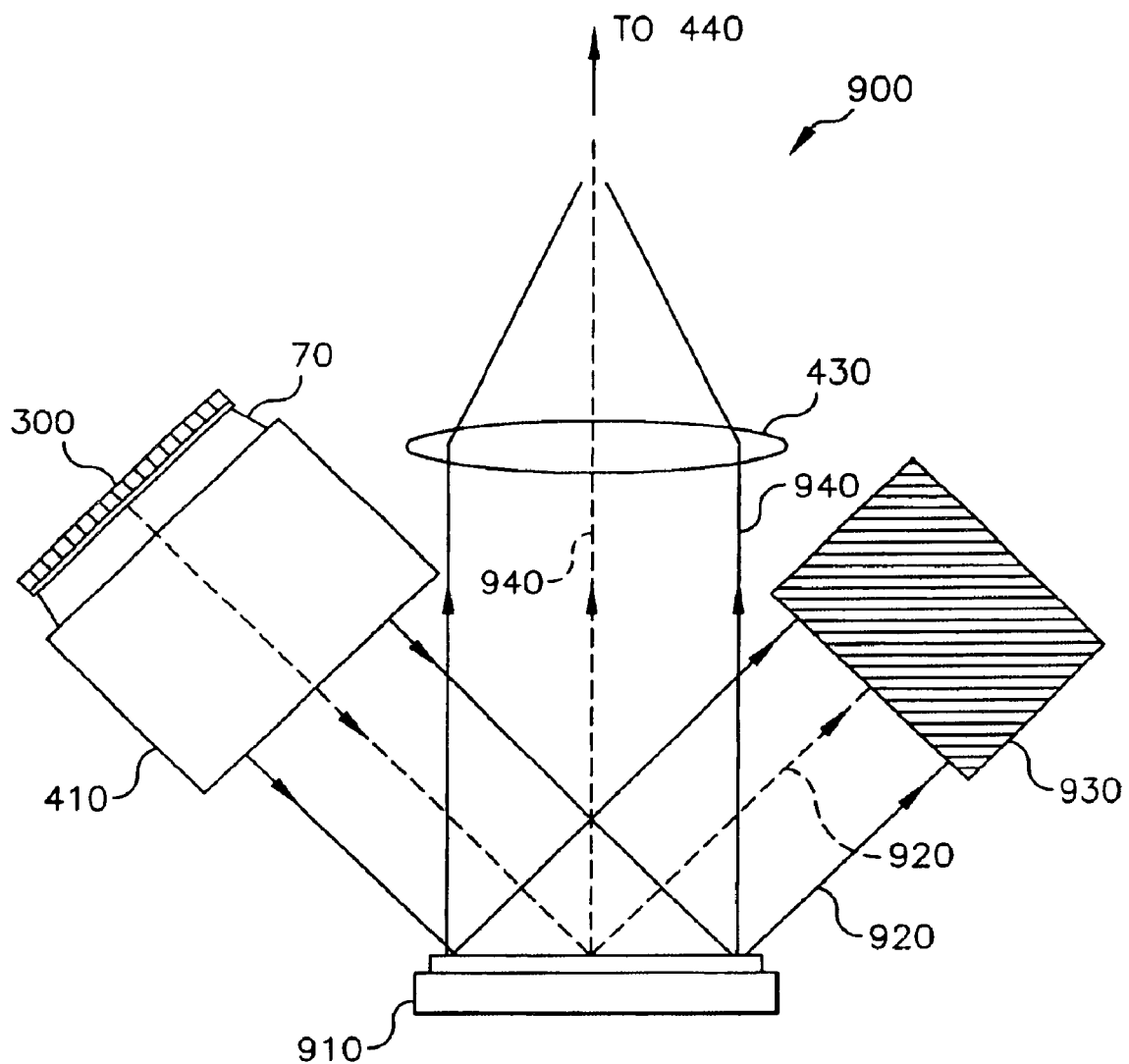
FIG. 12 is a cross-sectional view of a modulation optical system using an array of vertical cavity organic lasers with a micromirror array light valve.

FIG. 12 is a cross-sectional view of a modulation optical system 900 using an organic VCSEL array with a micromirror array light valve. The modulation optical system 900 comprises an organic VCSEL array 300 that emits laser light 70. Beam-shaping optics 410 are provided that produce an illumination profile that is uniform and matched in area to the desired illumination of a micromirror array light valve 910. Note that the desired illumination area does not necessarily correspond to the fill area of the micromirror array light valve 910. Any of the embodiments for the beam-shaping optics 410 that were discussed in describing FIGS. 5 through 9 can be used. The micromirror array light valve 910 can be a Digital Light Processing® (DLP®) chip available from Texas Instruments.

Each individually operable light-modulating pixel on the micromirror array light valve 910 modulates light by reflecting the light in one of two directions. When a light-modulating pixel is in an off-state, it reflects incident light in a first direction to produce an off-state beam 920 that is captured by a beam stop 930. When a light-modulating pixel is in an on-state, it reflects incident light in a second direction to produce an on-state beam 940. In order to form an electronic imaging system from the modulation optical system 900, a projection lens 430 can be provided that receives the on-state beam 940 and produces therefrom an image of the micromirror array light valve 910 on a target plane 440. A continuous-tone pictorial image is generated using the micromirror array light valve 910 by individually controlling each light-modulating pixel to switch into the on-state for a portion of a frame time that produces a desired grey-scale value.

We now turn to a description of full-color electronic imaging systems using organic VCSEL arrays. For these systems, it is assumed that at least three different color laser sources are required, and the following will consider lasers emitting in the red, green, and blue spectral ranges. For printing systems, the requirement for red, green, and blue laser sources applies to printing using photographic media. However, for electrophotographic printing, a single source in the red spectral region can be used, with different toners applied to achieve a full-color image. Thus, any of the previously described optical systems can be used for a full-color electrophotographic laser printer.

Figure 13:
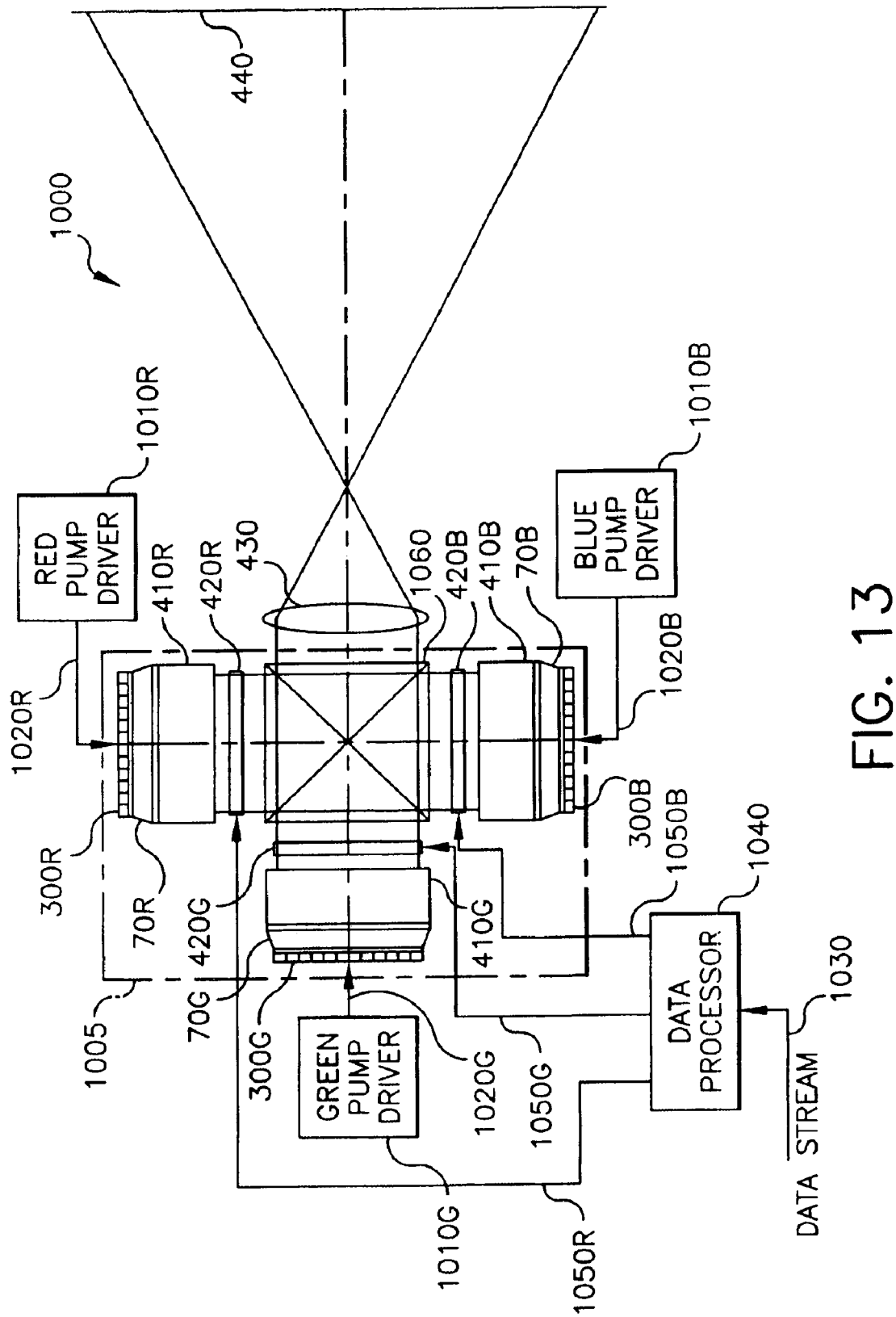
FIG. 13 is a schematic view of a full-color electronic imaging system using three arrays of vertical cavity organic lasers with three area light valves.

FIG. 13 is a schematic view of a fill-color electronic imaging system 1000 that uses a three-chip configuration. The full-color electronic imaging system 1000 comprises a full-color modulation optical system 1005 that creates a full-color image comprising two-dimensional red, green, and blue intensity patterns, and a projection lens 430 that projects the full-color image onto a target plane 440. The full-color modulation optical system 1005 comprises a red organic VCSEL array 300R. The pump source array included in the red organic VCSEL array 300R receives a red pump signal 1020R from a red pump driver 1010R, which causes the individual pump sources to emit pump light. When pumped, the red organic VCSEL array 300R emits red laser light 70R having a wavelength in the red portion of the visible spectrum. The red laser light 70R is collected by red beam-shaping optics 41 OR that produce a desired illumination of a red area light valve 420R. The red beam-shaping optics 41 OR can be any of those discussed in describing FIGS. 5 through 9. The red area light valve 420R is preferred to be a reflective liquid crystal light valve or a micromirror array light valve, although it can be a transmissive liquid crystal light valve as FIG. 13 suggests.

The full-color modulation optical system 1005 further comprises a green organic VCSEL array 300G. The pump source array included in the green organic VCSEL array 300G receives a green pump signal 1020G from a green pump driver 1010G, which causes the individual pump sources to emit pump light. When pumped, the green organic VCSEL array 300G emits green laser light 70G having a wavelength in the green portion of the visible spectrum. The green laser light 70G is collected by green beam-shaping optics 410G that produce a desired illumination of a green area light valve 420G. The green beam-shaping optics 410G can be any of those discussed in describing FIGS. 5 through 9. The green area light valve 420G is preferred to be of the same type as the red area light valve 420R.

The full-color modulation optical system 1005 further comprises a blue organic VCSEL array 300B. The pump source array included in the blue organic VCSEL array 300B receives a blue pump signal 1020B from a blue pump driver 1010B, which causes the individual pump sources to emit pump light. When pumped, the blue organic VCSEL array 300B emits blue laser light 70B having a wavelength in the blue portion of the visible spectrum. The blue laser light 70B is collected by blue beam-shaping optics 410B that produce a desired illumination of a blue area light valve 420B. The blue beam-shaping optics 4101B can be any of those discussed in describing FIGS. 5 through 9. The blue area light valve 420B is preferred to be of the same type as the red area light valve 420R and the green area light valve 420G.

The full-color electronic imaging system 1005 further comprises a data stream 1030 that provides data to be encoded in the form of a full-color image. The data could, for example, correspond to still images for a printing or display system or video motion images for a display system. A data processor 1040 receives data from the data stream 1030 and produces a red light valve drive signal 1050R to drive the red area light valve 420R, a green light valve drive signal 1050G to drive the green area light valve 420G, and a blue light valve drive signal 1050B to drive the blue area light valve 420B. In accordance with these drive signals, the light valves form red, green, and blue images on the red area light valve 420R, the green area light valve 420G, and the blue area light valve 420B, respectively.

The full-color modulation optical system 1005 further comprises a color combiner 1060 that receives light modulated by the red area light valve 420R, the green area light valve 420G, and the blue area light valve 420B, and combines them into one beam. Many suitable embodiments for a color combiner 1060 are known in the prior art, with preferable examples being an X-cube (as depicted in FIG. 13) or a Philips prism. The projection lens 430 projects the full-color image onto the target plane 440, the full-color image consisting of magnified and overlapping red, green, and blue images.

Figure 14:
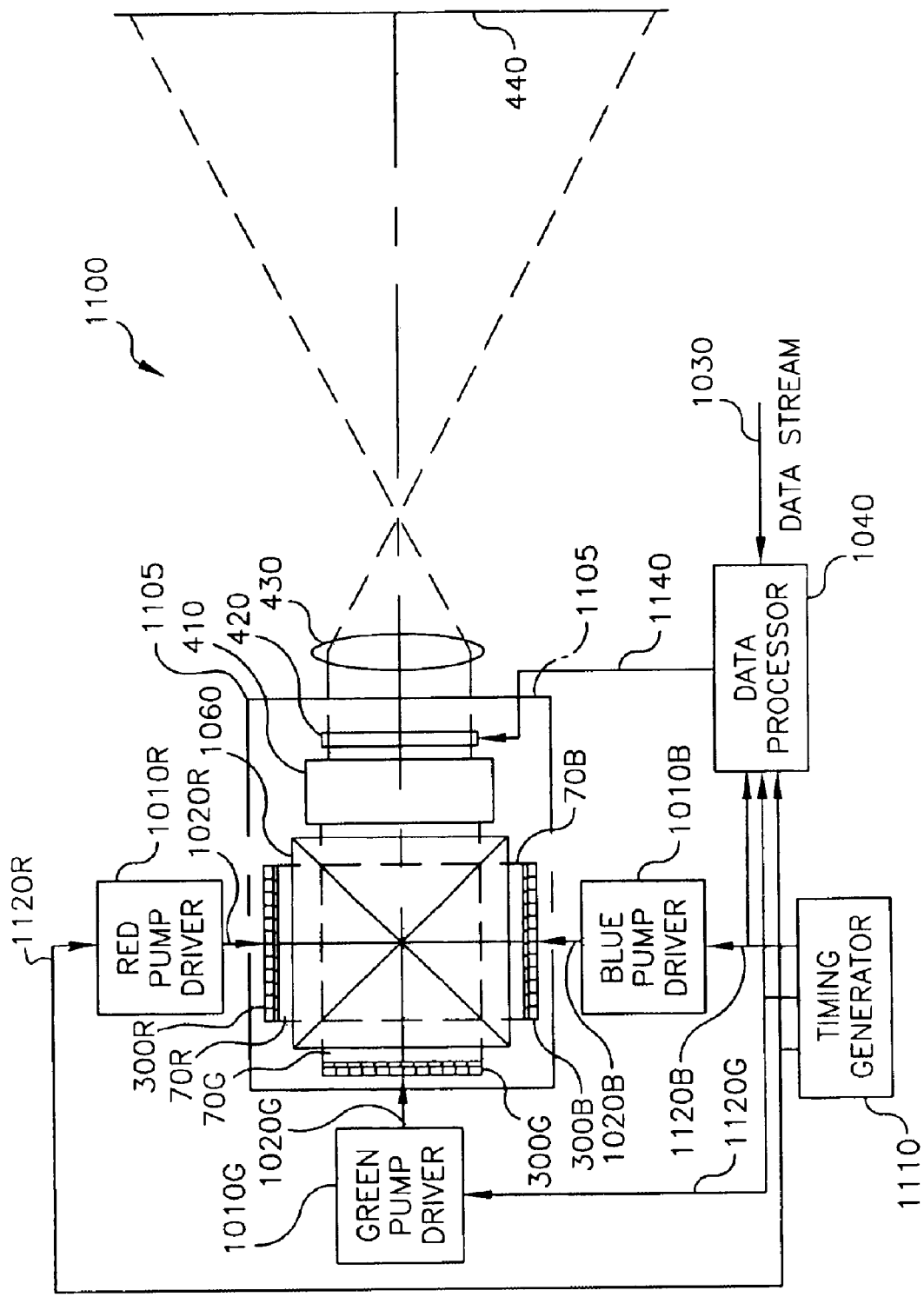
FIG. 14 is a schematic view of a full-color color-sequential electronic imaging system using three arrays of vertical cavity organic lasers with an area light valve.

FIG. 14 is a schematic view of a full-color electronic imaging system 1100 that is field color-sequential and uses three arrays of organic vertical cavity lasers. The full-color electronic imaging system 1100 comprises a full-color modulation optical system 1105 that creates a full-color image comprising two-dimensional red, green, and blue intensity patterns, and a projection lens 430 that projects the full-color image onto a target plane 440. The full-color modulation optical system 1105 comprises a red organic VCSEL array 300R. The pump source array included in the red organic VCSEL array 300R receives a red pump signal 1020R from a red pump driver 1010R, which causes the individual pump sources to emit pump light. When pumped, the red organic VCSEL array 300R emits red laser light 70R having a wavelength in the red portion of the visible spectrum.

The full-color modulation optical system 1105 further comprises a green organic VCSEL array 300G. The pump source array included in the green organic VCSEL array 300G receives a green pump signal 1020G from a green pump driver 1010G, which causes the individual pump sources to emit pump light. When pumped, the green organic VCSEL array 300G emits green laser light 70G having a wavelength in the green portion of the visible spectrum.

The full-color modulation optical system 1105 further comprises a blue organic VCSEL array 300B. The pump source array included in the blue organic VCSEL array 300B receives a blue pump signal 1020B from a blue pump driver 1010B, which causes the individual pump sources to emit pump light. When pumped, the blue organic VCSEL array 300B emits blue laser light 70B having a wavelength in the blue portion of the visible spectrum.

The full-color modulation optical system 1105 further comprises a color combiner 1060 to receive the red laser light 70R, green laser light 70G, and blue laser light 70B and form a single beam. Beam-shaping optics 410 are provided that receive the single beam and produce a desired illumination of an area light valve 420. The beam-shaping optics 410 can be any of those discussed in describing FIGS. 5 through 9. Although the color combiner 1060 is shown as an X-cube in FIG. 14, it can instead be a Philips prism or a pair of dichroic mirrors. Dichroic mirrors are an acceptable embodiment for the color combiner 1060 in the full-color modulation optical system 1105 because they are not disposed in the imaging path between the area light valve 420 and the target plane 440 of the full-color electronic imaging system 1100. Conversely, dichroic mirrors are not a preferred embodiment for the color combiner 1060 in the full-color modulation optical system 1005 of FIG. 13, because the tilted mirror substrates would introduce astigmatism and coma into the images produced by the projection lens 430 of the full-color electronic imaging system 1000.

The full-color electronic imaging system 1105 further comprises a data stream 1030 that provides data to be encoded in the form of a full-color image. The data could, for example, correspond to still images to a printing or display system or video motion images to a display system. A data processor 1040 receives data from the data stream 1030 and produces a light valve drive signal 1140 to drive the area light valve 420. A timing generator 1110 is further provided in order to synchronize the light valve modulation to sequential illumination of the red, green, and blue organic VCSEL arrays 300R, 300G, and 300B. The timing generator 1110 produces a red timing signal 1120R, a green timing signal 1120G, and a blue timing signal 1120B.

Figure 15:
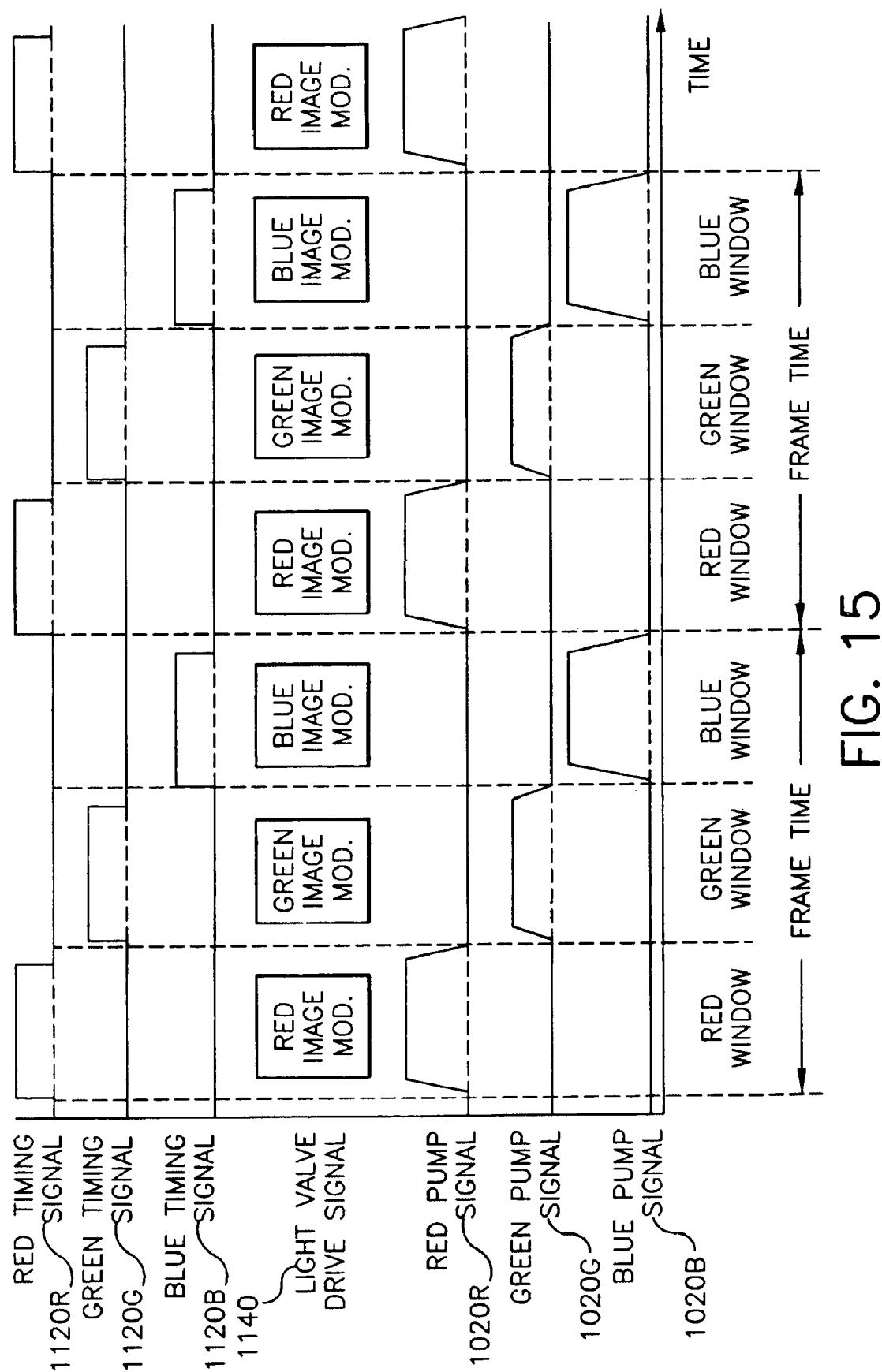
FIG. 15 is a timing diagram demonstrating the temporal relationship in the color-sequential electronic imaging system between the red, green, and blue light valve drive signals and the red, green, and blue laser drive signals.

Turning now to FIG. 15, the action of the timing generator 1110 on the red, green, and blue organic VCSEL arrays 300R, 300G, and 300B, respectively, and the image data processor 1040, shown in FIG. 14, will be described in detail. FIG. 15 is a timing diagram demonstrating the temporal relationship in the full-color electronic imaging system 1100 between the red, green, and blue timing signals 1120R, 1120G, and 1120B, respectively, the light valve drive signal 1140 and the red, green, and blue pump signals 1020R, 1020G, and 1020B, respectively. The horizontal axis is the time axis, and is broken into a number of identical frame times. The frame times represent the times in which individual frames of a video motion image are displayed for a display system. For a printing system, the frame time shown might represent the printing time of a single page, although it could alternatively represent the time of a single exposure if multiple exposures per page are used. Each frame time is broken up into a red window, a green window, and a blue window, in which the red, green, and blue images, respectively, are produced. The timing diagram of FIG. 15 suggests that the red, green, and blue windows are of equal duration. While this is generally preferable, it is not a requirement, and different window times could be used, for example, to compensate for differences in laser power and/or viewer or media sensitivity between the red, green, and blue channels.

The vertical axis of the timing diagram in FIG. 15 consists of representations for the various signals. Within the red window, the red timing signal 1120R is enabled. The enabling of the red timing signal 1120R initiates the start of a turning on of the red pump signal 1020R and, with an optional delay to allow the red laser light 70R to stabilize, the light valve drive signal 1140 is enabled to send a red image modulation signal to the area light valve 420 shown in FIG. 14. During this red window, the red organic VCSEL array 300R illuminates the area light valve 420, which modulates the red component of the full-color image with the red laser light 70R. At the end of the red window, the red timing signal 1120R is disabled, at which point the red pump signal 1020R is disabled and the red image modulation signal is removed from the light valve drive signal 1140.

Within the green window, the green timing signal 1120G is enabled. The enabling of the green timing signal 1120G initiates the start of a turning on of the green pump signal 1020G and, with an optional delay to allow the green laser light 70G to stabilize, the light valve drive signal 1140 is enabled to send a green image modulation signal to the area light valve 420. During this green window, the green organic VCSEL array 300G illuminates the area light valve 420, which modulates the green component of the full-color image with the green laser light 70G. At the end of the green window, the green timing signal 1120G is disabled, at which point the green pump signal 1020G is disabled and the green image modulation signal is removed from the light valve drive signal 1140.

Within the blue window, the blue timing signal 1120B is enabled. The enabling of the blue timing signal 1120B initiates the start of a turning on of the blue pump signal 1020B and, with an optional delay to allow the blue laser light 70B to stabilize, the light valve drive signal 1140 is enabled to send a blue image modulation signal to the area light valve 420. During this blue window, the blue organic VCSEL array 300B illuminates the area light valve 420, which modulates the blue component of the full-color image with the blue laser light 70B. At the end of the blue window, the blue timing signal 1120B is disabled, at which point the blue pump signal 1020B is disabled and the blue image modulation signal is removed from the light valve drive signal 1140. The process is repeated for subsequent frames in which the red, green, and blue image modulation signals encode the particular data for the subsequent frames onto a full-color image.

Returning now to FIG. 14, the full-color electronic imaging system 1100 could be applied to, for example, a display system. Then the full-color electronic imaging system 1100 used in a display system would produce red, green, and blue images in a sequence too rapid for the eye to distinguish (in practice, such as above the flicker frequency, or a frame time below approximately 30 ms). Thus, an observer sees a full-color image rather than a sequence of monochromatic images.

Figure 16:
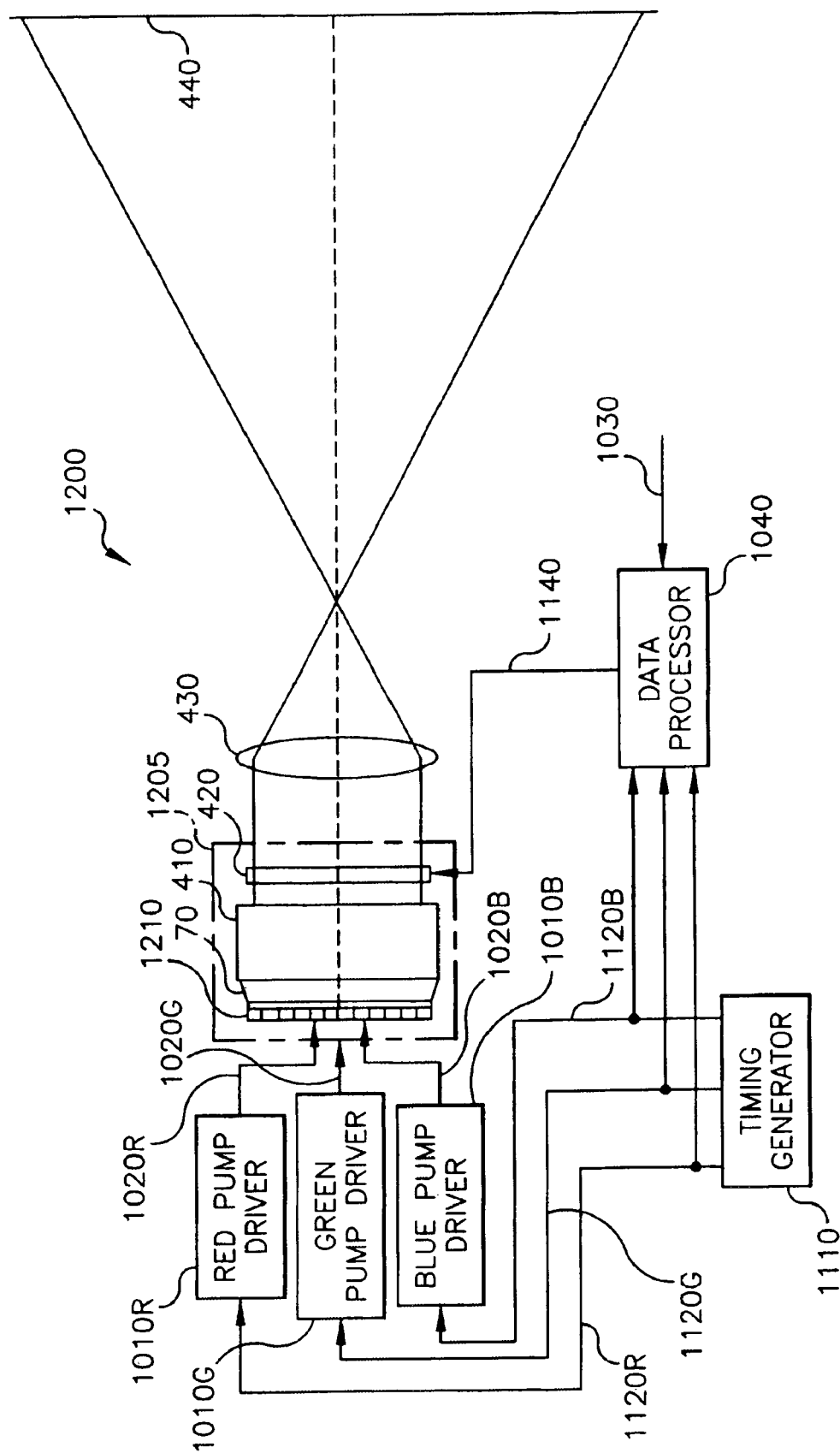
FIG. 16 is a schematic view of a full-color color-sequential electronic imaging system using a single array of vertical cavity organic lasers with an area light valve.

FIG. 16 is a schematic view of a full-color electronic imaging system 1200 that is field color-sequential and uses a single array of organic vertical cavity lasers. The full-color electronic imaging system 1200 comprises a full-color modulation optical system 1205 that creates a full-color image comprising two-dimensional red, green, and blue intensity patterns, and a projection lens 430 that projects the full-color image onto a target plane 440. The full-color modulation optical system 1205 comprises a full-color organic VCSEL array 1210 that is capable of emitting laser light 70 in the red, green, and blue portions of the visible spectrum. The full-color organic VCSEL array 1210 emits red laser light in response to a red pump signal 1020R provided by a red pump driver 1010R. The full-color organic VCSEL array 1210 emits green laser light in response to a green pump signal 1020G provided by a green pump driver 1010G. The full-color organic VCSEL array 1210 emits blue laser light in response to a blue pump signal 1020B provided by a blue pump driver 1010B. Beam-shaping optics 410 are provided that receive the laser light 70 and produce a desired illumination of an area light valve 420. The beam-shaping optics 410 can be any of those discussed in describing FIGS. 5 through 9.

The full-color electronic imaging system 1200 further comprises a data stream 1030 that provides data to be encoded in the form of a full-color image. The data could, for example, correspond to still images to a printing or display system or video motion images to a display system. A data processor 1040 receives data from the data stream 1030 and produces a light valve drive signal 1140 to drive the area light valve 420. A timing generator 1110 is further provided in order to synchronize the light valve modulation to sequential red, green, and blue illumination from the full-color organic VCSEL array 1210. The timing generator 1110 produces a red timing signal 1120R, a green timing signal 1120G, and a blue timing signal 1120B. The timing diagram described in relation to FIG. 15 applies again to the color sequential process used in the full-color electronic imaging system 1200.

Figure 17:
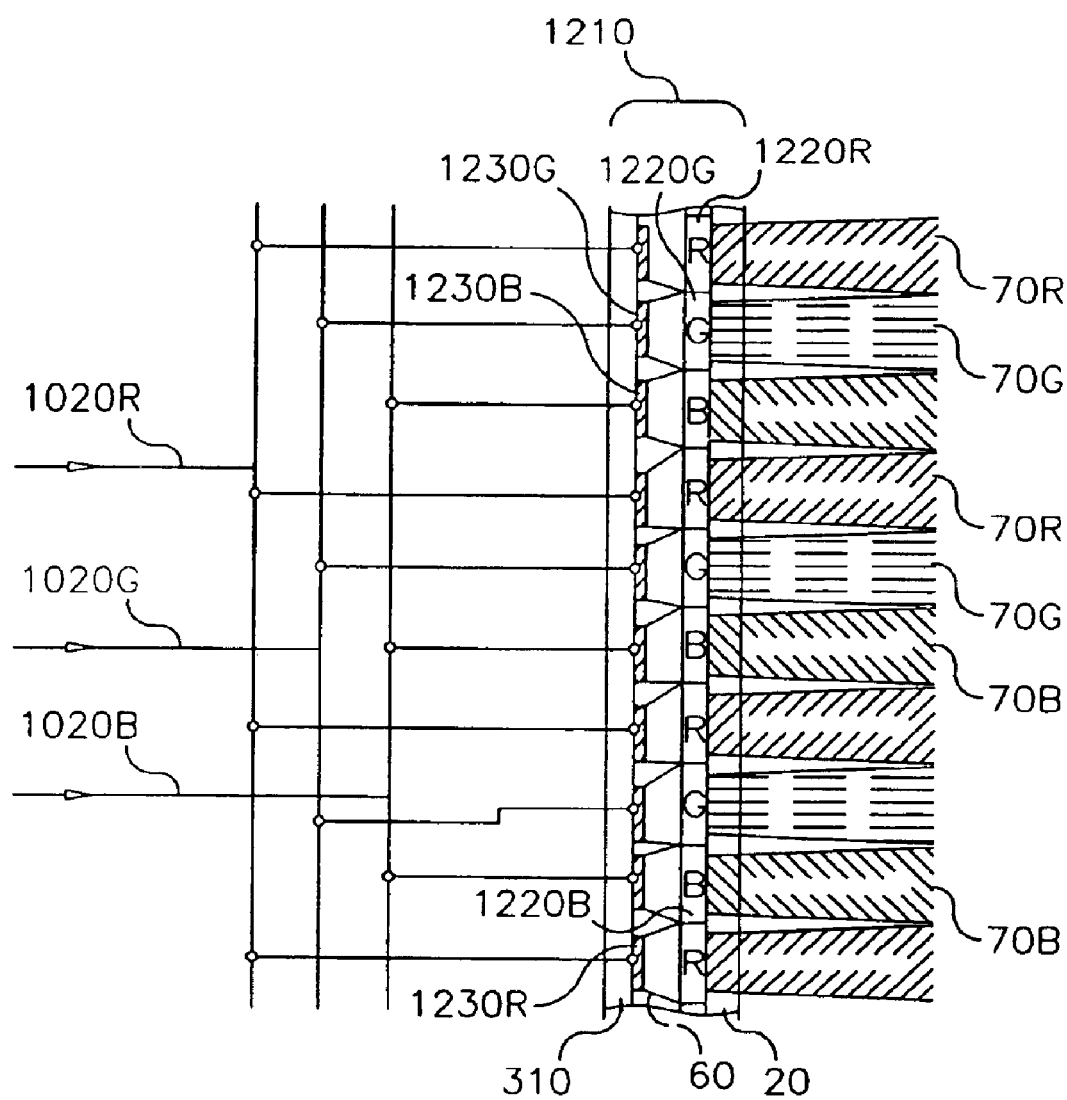
FIG. 17 is a schematic view of a three-color array of vertical cavity organic lasers suitable for use in the full-color color-sequential electronic imaging system using a single array of vertical cavity organic lasers with an area light valve.

The full-color organic VCSEL array 1210 is described now in detail. FIG. 17 is a schematic cross-sectional view of one embodiment of a full-color organic VCSEL array 1210. The full-color organic VCSEL array 1210 comprises a pump source array 310 including red pump array elements 1230R, green pump array elements 1230G, and blue pump array elements 1230B. The full-color organic VCSEL array 1210 further comprises a substrate 20. Red organic laser elements 1220R are provided on the substrate 20 with an organic dopant suited to emit red laser light 70R with a wavelength in the red portion of the optical spectrum. The red organic laser elements 1220R are aligned to the red pump array elements 1230R that produce pump beams 60 in response to a red pump signal 1020R. The pump beams 60 produced by the red pump array elements 1230R excite the red organic laser elements 1220R, causing them to emit the red laser light 70R.

The full-color organic VCSEL array 1210 further comprises green organic laser elements 1220G, which are provided on the substrate 20 and which include an organic dopant suited to emit green laser light 70G with a wavelength in the green portion of the optical spectrum. The green organic laser elements 1220G are aligned to the green pump array elements 1230G that produce pump beams 60 in response to a green pump signal 1020G. The pump beams 60 produced by the green pump array elements 1230G excite the green organic laser elements 1220G, causing them to emit the green laser light 70G.

The full-color organic VCSEL array 1210 further comprises blue organic laser elements 1220B, which are provided on the substrate 20 and which include an organic dopant suited to emit blue laser light 70B with a wavelength in the blue portion of the optical spectrum. The blue organic laser elements 1220B are aligned to the blue pump array elements 1230B that produce pump beams 60 in response to a blue pump signal 1020B. The pump beams 60 produced by the blue pump array elements 1230B excite the blue organic laser elements 1220B, causing them to emit the blue laser light 70G.

Thus, when the full-color organic VCSEL array 1210 shown in FIG. 17 is used in the full-color electronic imaging system 1200 shown in FIG. 16, the red, green, and blue pump signals 1020R, 1020G, and 1020B would sequentially be enabled to sequentially activate the red, green, and blue organic laser elements 1220R, 1220G, and 1220B, respectively.

It should be considered obvious that other arrangements of the red, green, and blue organic laser elements 1220R, 1220G, and 1220B can be used. The cross-section in FIG. 17 shows the organic laser elements alternating by color, which could suggest an alternating configuration in both dimensions of the full-color organic VCSEL array 1210 or alternating in a single dimension of the full-color organic VCSEL array 1210 with rows of single-colored organic laser elements. Alternatively, the red, green, and blue organic laser elements 1220R, 1220G, and 1220B, can be organized in other arrangements, such as coarse regions of multiple single-colored organic laser elements. Similarly, the different colors can have different numbers of organic laser elements within the full-color organic VCSEL array 1210. This can be done, for example, to compensate for differences in laser or system efficiency or viewer/receiver sensitivity.

The invention has been described with reference to one or more embodiments. However, it will be appreciated that variations and modifications can be effected by a person of ordinary skill in the art without departing from the scope of the invention. As a pertinent example, the full-color electronic imaging embodiments described herein have assumed three colors (red, green, and blue) are used for the generation of the image. However, two colors can be used for a grey scale imaging system, or more than three colors for a wide-gamut electronic imaging system. It is also conceivable that three colors that are not red, green, and blue could be utilized, for example in a false-color printing system. These specifically-named variations are deemed to be easily effected by a person of ordinary skill in the art.

PARTS LIST 10 vertical cavity organic laser device
20 substrate
30 first dielectric stack
35 organic laser film structure
40 organic active region
50 second dielectric stack
60 pump beam
65 source of photons
70 laser light
70R red laser light
70G green laser light
70B blue laser light
80 vertical cavity organic laser device
100 periodic gain regions
103 antinode
105 node
110 organic spacer layers 120 electromagnetic field pattern
190 phase-locked organic laser array
200 laser pixels
210 inter-pixel regions
220 etched regions
221 circular pillars
300 organic VCSEL array
300R red organic VCSEL array
300G green organic VCSEL array
300B blue organic VCSEL array
310 Pump source array
320 Pump array elements
330 organic laser elements
340 activated organic laser element
350 activated pump element
400 electronic imaging system
405 modulation optical system
410 beam-shaping optics
410R red beam-shaping optics
410G green beam-shaping optics
410B blue beam-shaping optics
420 area light valve
420R red area light valve
420G green area light valve
420B blue area light valve
430 projection lens
440 target plane
500 electronic imaging system
505 modulation optical system
510 combiner lenslet array
520 combiner field lens
550 electronic imaging system
552 modulation optical system
555 lenslet combiner system
557 fly's eye integrator
560 matched pair of lenslet arrays
570 fly's eye coupling optics
600 electronic imaging system
605 modulation optical system
610 condensing lens
620 integrating bar
630 homogenized light
640 light pipe optics
650 monolithic integrator
700 individual laser spectrum
710 spectral band
800 modulation optical system
810 prepolarizer
820 polarizing beam splitter
830 reflective liquid crystal light valve
840 analyzer
900 modulation optical system
910 micromirror array light valve
920 off-state beam
930 beam stop
940 on-state beam
1000 full-color electronic imaging system
1005 full-color modulation optical system
1010R red pump driver
1010G green pump driver
1010B blue pump driver
1020R red pump signal
1020G green pump signal
1020B blue pump signal
1030 data stream
1040 data processor
1050R red light valve drive signal
1050G green light valve drive signal
1050B blue light valve drive signal
1060 color combiner
1100 full-color electronic imaging system
1105 full-color modulation optical-system
1110 timing generator
1120R red timing signal
1120G green timing signal
1120B blue timing signal
1140 light valve drive signal
1200 full-color electronic imaging system
1205 full-color modulation optical system
1210 full-color organic VCSEL array
1220R red organic laser element
1220G green organic laser element
1220B blue organic laser element
1230R red pump array element
1230G green pump array element
1230B blue pump array element

What is claimed is:

1. An electronic imaging system for providing a viewable color image from an image data stream, comprising:

a) a plurality of different colored laser light sources arranged in an at least one array with each laser light source including a vertical cavity design having:
      i) a first dielectric stack for receiving and transmitting incoherent pump beam light and being reflective to laser light over a predetermined range of wavelengths;
      ii) an organic active region, including one or more periodic gain regions and organic spacer layers disposed on either side of the periodic gain regions, for receiving transmitted incoherent pump beam light from the first dielectric stack and emitting the laser light, and wherein the one or more periodic gain regions are aligned with antinodes of a standing wave electromagnetic field;
      iii) a second dielectric stack for reflecting transmitted incoherent pump beam light and laser light from the organic active region back into the organic active region, wherein a combination of the first and the second dielectric stacks and the organic active region produces the laser light; and
   b) at least one area light valve for receiving the laser light and producing the viewable color image from the image data stream; and a projection lens for projecting the viewable color image onto a target plane.

2. The electronic imaging system claimed in claim 1, further comprising:

d) a lens for imaging the at least one array onto the at least one area light valve.

3. The electronic imaging system claimed in claim 1, wherein the plurality of different colored laser light sources are modulated to produce a uniform image on the target plane.

4. The electronic imaging system claimed in claim 1, wherein three arrays of colored laser light sources are matched, according to color, to three area light valves, respectively.

5. The electronic imaging system claimed in claim 4, wherein the three arrays of colored laser light sources include:

a) a red array of laser light sources;
   b) a green array of laser light sources; and
   c) a blue array of laser light sources.

6. The electronic imaging system claimed in claim 5, wherein the three arrays of colored laser light sources further include:
   a) a red array of laser light sources illuminating a red area light valve;
   b) a green array of laser light sources illuminating a green area light valve; and
   c) a blue array of laser light sources illuminating a blue area light valve.

7. The electronic imaging system claimed in claim 1, wherein three arrays of colored laser light sources are matched to a single area light valve.

8. The electronic imaging system claimed in claim 7, wherein the three arrays of colored laser light sources include:
   a) a red array of laser light sources;
   b) a green array of laser light sources; and
   c) a blue array of laser light sources.

9. The electronic imaging system claimed in claim 8, wherein each of the at least three arrays of colored laser light sources are sequentially pumped within a frame.

10. The electronic imaging system claimed in claim 9, wherein each of the at least three arrays of colored laser light sources are synchronized to the single area light valve during the sequential pumping of the at least three arrays of colored laser light sources.

11. The electronic imaging system claimed in claim 1, wherein a single array of colored laser light sources includes:
   a) plurality of red laser light sources;
   b) plurality of green laser light sources; and
   c) plurality of blue laser light sources.

12. The electronic imaging system claimed in claim 11, wherein the at least one area light valve is illuminated by the single array of colored laser light sources.

13. The electronic imaging system claimed in claim 11, wherein the plurality of red laser light sources, the plurality of green laser light sources, and the plurality of blue laser light sources are sequentially pumped within a frame.

14. The electronic imaging system claimed in claim 13, wherein each of the plurality of red laser light sources, the plurality of green laser light sources, and the plurality of blue laser light sources are synchronized, respectively, to the single area light valve during the pumping sequence.

15. The electronic imaging system claimed in claim 1, further comprising:
   d) at least one light integrator for producing a uniform illumination on the at least one area light valve.

16. The electronic imaging system claimed in claim 15, wherein the at least one light integrator includes a fly's eye integrator.

17. The electronic imaging system claimed in claim 15, wherein the at least one light integrator includes an integrating bar.

18. The electronic imaging system claimed in claim 1, wherein the at least one area light valve includes a liquid crystal panel.

19. The electronic imaging system claimed in claim 18, wherein the liquid crystal panel is a reflective liquid crystal on silicon light valve.

20. The electronic imaging system claimed in claim 1, wherein the at least one area light valve includes a micromirror array.

21. The electronic imaging system claimed in claim 1, wherein each laser light source produces laser light with a laser spectrum having an individual wavelength, $\lambda_i$ and an individual spectral width $\Delta\lambda_i$.

22. The electronic imaging system claimed in claim 21, wherein a combination of the plurality of different colored laser light sources produces at least one spectral band having a total spectral width $\Delta\lambda_{tot}$.

23. The electronic imaging system claimed in claim 21, wherein the at least one spectral band includes overlapping laser spectra.

24. The electronic imaging system claimed in claim 22, wherein the total spectral width $\Delta\lambda_{tot}$ is greater than 1 nanometer.

25. The electronic imaging system claimed in claim 1 wherein each laser light source produces laser light with a beam quality factor $M^2$ the at least one array comprises $N_{LE}$ colored laser light sources, wherein the product of $M^2$ and $N_{LE}$ is greater than 1000.

26. The electronic imaging system claimed in claim 18, wherein the at least one array of colored laser light sources is provided directly on a front face of the integrating bar.

27. The electronic imaging system claimed in claim 1, wherein the electronic imaging system is incorporated into a display system, further comprising
   d) a viewing screen for receiving the laser light and having a diffusing element.

28. The electronic imaging system claimed in claim 27 wherein the viewing screen has an optical surface roughness $\sigma_z$ and the plurality of different colored light sources has a total spectral width $\sigma_k$ such that $C_T = [1+(2\sigma_k\sigma_z)^2]^{-1/4}$ is less than 0.5.

29. The electronic imaging system claimed in claim 1, wherein the electronic imaging system is incorporated into a printing system, further comprising
   d) a photosensitive medium located at the target plane for receiving the laser light and recording data.

30. A modulation optical system for providing a color image from an image data stream, comprising:
   a) a plurality of different colored laser light sources arranged in an at least one array with each laser light source including a vertical cavity design having:
      i) a first dielectric stack for receiving and transmitting pump beam light and being reflective to laser light over a predetermined range of wavelengths;
      ii) an organic active region, including one or more periodic gain regions and organic spacer layers disposed on either side of the periodic gain regions, for receiving transmitted pump beam light from the first dielectric stack and emitting the laser light, and wherein the one or more periodic gain layers are aligned with antinodes of a standing wave electromagnetic field;
      iii) a second dielectric stack for reflecting transmitted pump beam light and laser light from the organic active region back into the organic active region, wherein a combination of the first and the second dielectric stacks and the organic active region produces the laser light; and
   b) at least one area light valve for receiving the laser light and producing the color image from the image data stream; and
   wherein at least a portion of the plurality of different colored light sources arranged in a given array are nominally incoherent with another portion of the different colored light sources within the given array.

31. The modulation optical system claimed in claim 30, further comprising:
   c) a lens for imaging the at least one array onto the at least one area light valve.

32. The modulation optical system claimed in claim 30, wherein the plurality of different colored laser light sources are modulated to produce a uniform image on the at least one area light valve.

33. The modulation optical system claimed in claim 30, wherein three arrays of colored laser light sources are matched, according to color, to three area light valves, respectively.

34. The modulation optical system claimed in claim 33, wherein the three arrays of colored laser light sources include:
   a) a red array of laser light sources;
   b) a green array of laser light sources; and
   c) a blue array of laser light sources.

35. The modulation optical system claimed in claim 34, wherein the three arrays of colored laser light sources further include:
   a) a red array of laser light sources illuminating a red area light valve;
   b) a green array of laser light sources illuminating a green area light valve; and
   c) a blue array of laser light sources illuminating a blue area light valve.

36. The modulation optical system claimed in claim 30, wherein three arrays of colored laser light sources are matched to a single area light valve.

37. The modulation optical system claimed in claim 36, wherein the three arrays of colored laser light sources include:
   a) a red array of laser light sources;
   b) a green array of laser light sources; and
   c) a blue array of laser light sources.

38. The modulation optical system claimed in claim 37, wherein each of the at least three arrays of colored laser light sources are sequentially pumped within a frame.

39. The modulation optical system claimed in claim 38, wherein each of the at least three arrays of colored laser light sources are synchronized to the single area light valve during the sequential pumping of the at least three arrays of colored laser light sources.

40. The modulation optical system claimed in claim 30, wherein a single array of colored laser light sources includes:
   a plurality of red laser light sources;
   a plurality of green laser light sources; and
   a plurality of blue laser light sources.

41. The modulation optical system claimed in claim 40, wherein the at least one area light valve is illuminated by the single array of colored laser light sources.

42. The modulation optical system claimed in claim 40, wherein the plurality of red laser light sources, the plurality of green laser light sources, and the plurality of blue laser light sources are sequentially pumped within a frame.

43. The modulation optical system claimed in claim 42, wherein each of the plurality of red laser light sources, the plurality of green laser light sources, and the plurality of blue laser light sources are synchronized, respectively, to the single area light valve during the pumping sequence.

44. The modulation optical system claimed in claim 30, further comprising:
   c) at least one light integrator for producing a uniform illumination on the at least one area light valve.

45. The modulation optical system claimed in claim 44, wherein the at least one light integrator includes a fly's eye integrator.

46. The modulation optical system claimed in claim 44, wherein the at least one light integrator includes an integrating bar.

47. The modulation optical system claimed in claim 30, wherein the at least one area light valve includes a liquid crystal panel.

48. The modulation optical system claimed in claim 47, wherein the liquid crystal panel is a reflective liquid crystal on silicon light valve.

49. The modulation optical system claimed in claim 30, wherein the at least one area light valve includes a micromirror array.

50. The modulation optical system claimed in claim 30, wherein each laser light source produces laser light with a laser spectra having an individual wavelength, $\lambda_i$ and an individual spectral width $\Delta\lambda_i$.

51. The modulation optical system claimed in claim 50, wherein a combination of the plurality of different colored laser light sources produces at least one spectral band having a total spectral width $\Delta\lambda_{tot}$.

52. The modulation optical system claimed in claim 50, wherein the at least one spectral band includes overlapping laser spectra.

53. The modulation optical system claimed in claim 51, wherein the total spectral width $\Delta\lambda_{tot}$ is greater than 1 nanometer.

54. The electronic imaging system claimed in claim 30 wherein each laser light source produces laser light with a beam quality factor $M^2$ and the at least one array comprises $N_{LE}$ colored laser light sources, wherein the product of $M^2$ and $N_{LE}$ is greater than 1000.

55. The modulation optical system claimed in claim 46, wherein the at least one array of colored laser light sources is provided directly an a front face of the integrating bar.

56. The modulation optical system claimed in claim 30, wherein the modulation optical system is incorporated into a display system further comprising:
   c) a viewing screen for receiving colored laser light and having a diffusing element; and
   d) a projection lens for projecting the color image onto the viewing screen in order to form a viewable color image.

57. The modulation optical system claimed in claim 56 wherein the viewing screen has an optical surface roughness $\sigma_z$ and the plurality of different colored light sources has a total spectral width $\sigma_k$ such that $C_T=[1+(2\sigma_k\sigma_z)^2]^{-1/4}$ is less than 0.5.

58. The modulation optical system claimed in claim 30, wherein the modulation optical system is incorporated into a printing system, further comprising
   c) a photosensitive medium for receiving laser light and recording data.

59. An organic vertical cavity surface emitting laser array including a plurality of mutually incoherent lasing elements, and each organic vertical cavity surface emitting laser further comprising:
   i) a first dielectric stack for receiving and transmitting incoherent pump beam light from an array of light emitting diodes, and being reflective to laser light over a predetermined range of wavelengths;
   ii) an organic active region, including one or more periodic gain regions and organic spacer layers disposed on either side of the periodic gain regions, for receiving transmitted incoherent pump beam light from the first dielectric stack and emitting the laser light, and wherein the one or more periodic gain layers are aligned with antinodes of a standing wave electromagnetic field; and iii) a second dielectric stack for reflecting the transmitted incoherent pump beam light and laser light from the organic active region back into the organic active region, wherein the laser light is emitted from a plurality of different colored laser light sources arranged in at least one array, and a combination of the first and the second dielectric stacks and the organic active region produces the laser light.

60. The vertical cavity surface emitting laser claimed in claim 59, wherein the plurality of different colored laser light sources are modulated to produce a uniform image.

61. A method for producing colored laser light within an optical system, comprising the steps of:
 a) providing pump beam light from at least two light emitting diode;
 b) receiving and transmitting the pump beam light through a first dielectric stack;
 c) receiving and partially absorbing the transmitted pump beam light in an organic active region that emits laser light;
 d) reflecting the unabsorbed pump beam light from a second dielectric stack into the organic active region, wherein the unabsorbed pump beam light is partially absorbed and the organic active region produces the colored laser light;
 e) reflecting the colored laser light between the first dielectric stack and the second dielectric stack to provide a laser resonance.

62. A method for forming a color image from an image data stream, comprising the steps of:
 a) providing the image data stream to an electronic imaging system;
 b) generating colored laser light from the plurality of different colored laser light sources in the electronic imaging system, arranged in an at least one array, with each such color laser light source including a vertical cavity design having a plurality of mutually incoherent laser emitters, and further comprising:
  i) a first dielectric stack for receiving and transmitting pump beam light and being reflective to the colored laser light over a predetermined range of wavelengths;
  ii) an organic active region, including one or more periodic gain regions and organic spacer layers disposed on either side of the periodic gain regions, for receiving transmitted pump beam light from the first dielectric stack and emitting the colored laser light, and wherein the one or more periodic gain layers are aligned with antinodes of a standing wave electromagnetic field;
  iii) a second dielectric stack for reflecting the transmitted pump beam light and the colored laser light from the organic active region back into the organic active region, wherein a combination of the first and second dielectric stacks and the organic active region produces the colored laser light;
 c) receiving the colored laser light upon the at least one area light valve in the electronic imaging system; and
 d) forming the color image from the electronic imaging system upon a viewing screen.

63. The method claimed in claim 61, wherein there is colored laser light that is produced by the pump beam light from one light emitting diode which is incoherent from the colored laser light produced by the pump beam light from a second light emitting diode.

64. An addressable organic vertical cavity surface emitting laser array consisting of a series of mutually incoherent lasing elements, comprising:
 i) a first dielectric stack which is reflective to laser light over a predetermined range of wavelengths;
 ii) an organic active region for emitting said laser light;
 iii) a second dielectric stack for reflecting said laser light from said organic active region back into said organic active region, wherein a combination of said first and said second dielectric stacks and said organic active region produces said laser light;
 iv) an addressing means which corresponds to at least an individual lasing element; and
wherein said organic active region includes one or more periodic gain region(s) and organic spacer layers disposed on either side of the periodic gain region(s) and arranged so that the periodic gain region(s) is aligned with the antinodes of the device's standing wave electromagnetic field.

* * * * *